(12) United States Patent
Kennedy et al.

(10) Patent No.: US 11,430,056 B2
(45) Date of Patent: *Aug. 30, 2022

(54) SYSTEM AND METHOD FOR MANAGING RESTRICTIONS ON COLLECTION ACTIVITIES

(71) Applicant: Ontario Systems, LLC, Muncie, IN (US)

(72) Inventors: Amy Kennedy, Midlothian, VA (US); Megan Jones, Muncie, IN (US); Beth Waters, Muncie, IN (US); Dwayne Lott, Farmland, IN (US); Chris Repp, Pendleton, IN (US)

(73) Assignee: Ontario Systems, LLC, Muncie, IN (US)

( * ) Notice: Subject to any disclaimer, the term of this patent is extended or adjusted under 35 U.S.C. 154(b) by 65 days.

This patent is subject to a terminal disclaimer.

(21) Appl. No.: 16/698,397

(22) Filed: Nov. 27, 2019

(65) Prior Publication Data
US 2020/0175585 A1 Jun. 4, 2020

Related U.S. Application Data

(63) Continuation of application No. 14/839,556, filed on Aug. 28, 2015, now Pat. No. 10,497,054.

(51) Int. Cl.
*G06Q 40/00* (2012.01)
*G06Q 40/02* (2012.01)
(Continued)

(52) U.S. Cl.
CPC ............. *G06Q 40/02* (2013.01); *H04M 3/38* (2013.01); *H04M 3/5158* (2013.01); *H04M 3/4211* (2013.01)

(58) Field of Classification Search
CPC .... H04M 3/38; H04M 3/5158; H04M 3/4211; G06Q 40/02; G06Q 40/00
(Continued)

(56) References Cited

U.S. PATENT DOCUMENTS 8,335,740 B2 12/2012 Kennedy et al.
2003/0212566 A1* 11/2003 Fergusson ............... H04M 3/38
705/317

(Continued)

OTHER PUBLICATIONS

Dialog NPL (non-patent literature) Search Result-1, datedNov. 30, 2021. (Year: 2021).*

(Continued)

*Primary Examiner* — Hai Tran
(74) *Attorney, Agent, or Firm* — Maginot, Moore & Beck LLP

(57) ABSTRACT

A collection management system includes a collection server, a telephone dialing system, and a restriction features server. The collection server includes a memory having records, a debtor database and a local restrictions database. The telephone dialing system is connected to the collection server and is configured to access a telephony network and automatically dial a plurality of telephone numbers. Access to the telephony network by the telephone dialing system is restricted based on the information in the local restrictions database. The records of the collection server retain instances of restricted access to the telephony network by the telephone dialing system. The restriction features server is configured to connect to the collection server and update the restrictions database.

13 Claims, 20 Drawing Sheets

(51) Int. Cl.
  *H04M 3/51* (2006.01)
  *H04M 3/38* (2006.01)
  *H04M 3/42* (2006.01)

(58) Field of Classification Search
  USPC .................................................. 705/35–45
  See application file for complete search history.

(56) References Cited

U.S. PATENT DOCUMENTS

| | | | |
|---|---|---|---|
| 2005/0177599 A1* | 8/2005 | Goodman | G06Q 10/107 |
| 2007/0198388 A1* | 8/2007 | Libman | G06Q 40/02 |
| | | | 705/36 R |
| 2008/0095347 A1* | 4/2008 | Fotta | H04L 65/1079 |
| | | | 379/201.03 |
| 2011/0010277 A1* | 1/2011 | Enzaldo | G06Q 20/405 |
| | | | 705/30 |
| 2011/0295631 A1* | 12/2011 | Kennedy | G06Q 40/06 |
| | | | 705/7.11 |
| 2014/0214702 A1* | 7/2014 | Becker | G06Q 50/18 |
| | | | 705/311 |
| 2015/0088706 A1* | 3/2015 | Roark | G06Q 40/12 |
| | | | 705/30 |

OTHER PUBLICATIONS

Dialog NPL (non-patent literature) Search Result-2, dated Nov. 30, 2021. (Year: 2021).*
Google Scholar Search Result, dated Nov. 30, 2021. (Year: 2021).*
STIC Search Report, dated Apr. 13, 2022. (Year: 2022).*

* cited by examiner

COLLECTION RESTRICTIONS

`asc9863:57774/csp/CR/rmb.cr.csp.Main.cls?CSPCHD=000000010000XdOELa6Yvu0006PX9z7HrmEIMAT5LSrw20sW-#`

APPS ☐MAIN ☐IMPORTED ☰KATE KEY ☐FOGBUGZ ☐RELEASE NOTES UI

COLLECTION RESTRICTIONS  SELECTION  VIEW  RESTRICTIONS  HISTORY ▾

SAFE CALLING HOURS FOR BASE

[SAVE]

902 → AUTO DIALER | MANUAL DIAL

| STATE | DESCRIPTION | START | END | START(SUN) | END(SUN) | START | END | START(SUN) | END(SUN) |
|---|---|---|---|---|---|---|---|---|---|
| AB | ALBERTA | | | | | | | | |
| AK | ALASKA | 08:00:01AM | 07:00:00PM | | | 08:00:00AM | 09:00:00PM | 08:00:00AM | 09:00:00PM |
| AL | ALABAMA | 08:00:00AM | 09:00:00PM | | | 08:00:00AM | 09:00:00PM | 08:00:00AM | 09:00:00PM |
| AR | ARKANSAS | 08:00:00AM | 09:00:00PM | | | 08:00:00AM | 09:00:00PM | 08:00:00AM | 09:00:00PM |
| AS | AMERICAN SAMOA | 08:00:00AM | 09:00:00PM | | | 08:00:00AM | 09:00:00PM | 08:00:00AM | 09:00:00PM |
| AZ | ARIZONA | 08:00:00AM | 09:00:00PM | | | 08:00:00AM | 09:00:00PM | 08:00:00AM | 09:00:00PM |
| BC | BRITISH COLUMBIA | | | | | | | | |
| CA | CALIFORNIA | 09:00:00AM | 09:00:00PM | | | 09:00:00AM | 09:00:00PM | 08:00:00AM | 09:00:00PM |
| CO | COLORADO | 08:00:00AM | 09:00:00PM | | | 08:00:00AM | 09:00:00PM | 08:00:00AM | 09:00:00PM |

FIG. 9

| COLLECTION RESTRICTIONS × | | | | |
|---|---|---|---|---|
| ← → ⟲ ⌂ ⎕ osc9863:57774/csp/CR/rmb.cr.csp_Main.cls?CSPCHD=000000010000XdOELa6Vu0006PX9z7HrmEIMAT5LSrw20sW_# | | | | |
| ▦ APPS ☐ SECURELINK ☐ FROGBUG2 ☐ RELEASE NOTES UI | | | | |
| COLLECTION RESTRICTIONS | SELECTIONS | VIEW | RESTRICTIONS | HISTORY ▾ |

LICENSED(LIC) FOR BASE

[SAVE] [ADD]

| STATE | DESCRIPTION | LICENSED ⟵1102 | START DATE ⟵1104 | END DATE ⟵1106 | DISABLED |
|---|---|---|---|---|---|
| AK | ALASKA | ☑ | [ ⋮ ] | [ ⋮ ] | ☐ |
| AL | ALABAMA | ☐ | [ ⋮ ] | [ ⋮ ] | ☐ |
| AR | ARKANSAS | ☐ | [ ⋮ ] | [ ⋮ ] | ☐ |
| AS | AMERICAN SAMOA | ☐ | [ ⋮ ] | [ ⋮ ] | ☐ |
| AZ | ARIZONA | ☐ | [ ⋮ ] | [ ⋮ ] | ☐ |
| CA | CALIFORNIA | ☐ | [ ⋮ ] | [ ⋮ ] | ☐ |
| CO | COLORADO | ☐ | [ ⋮ ] | [ ⋮ ] | ☐ |
| CT | CONNECTICUT | ☐ | [ ⋮ ] | [ ⋮ ] | ☐ |
| DC | DISTRICT OF COLUMBIA | ☐ | [ ⋮ ] | [ ⋮ ] | ☐ |
| DE | DELAWARE | ☐ | [ ⋮ ] | [ ⋮ ] | ☐ |
| FG | FOREIGN GOVERNMENT | ☐ | [ ⋮ ] | [ ⋮ ] | ☐ |
| FL | FLORIDA | ☐ | [ ⋮ ] | [ ⋮ ] | ☐ |
| FM | FEDERATED STATES OF MICRONESIA | ☐ | [ ⋮ ] | [ ⋮ ] | ☐ |
| GA | GEORGIA | ☐ | [ ⋮ ] | [ ⋮ ] | ☐ |

RESTRICTION SELECTION

1302 — TYPE

BASE ▼

TYPE KEY

▼

CATEGORY

1320 — ALL-PARTY CONSENT TO RECORD ▼

| | ACTIVITY | SCRIPT |
| --- | --- | --- |
| | RECORDING | |
| | DIALING | |

AUTO DIAL START TIME (MON-SAT)
AUTO DIAL START TIME (SUN)
CALLS IN LST 7 DAYS TO ENTITY FOR CLIENT AND SET
CALLS TO MOBILE PHONE TODAY
CALLS TO MOBILE PHONE IN LAST 7 DAYS
CALLS TO POE IN LAST 31 DAYS
CALLS TO POE IN LAST 7 DAYS
CALLS TO RESIDENCE IN LAST 7 DAYS
MANUAL DIAL END TIME (MON-SAT)
MANUAL DIAL END TIME (SUN)
MANUAL DIAL START TIME (MON-SAT)
MANUAL DIAL START TIME (SUN)
NUMBER OF DAYS FROM VALIDATION LETTER BEFORE DIALING
NUMBER OF RINGS ALLOWED FOR DIALING
PREVENT CALLS TO POE
PREVENT CALLS TO POE WITHOUT CONSENT
PREVENT CALLS TO POE WITHOUT CONSENT OR EXHAUSTED HOME PHONES
PREVENT RECORDED CALLS
PREVENT UNATTENDED CALLS

— 1322

CALLS TO POE IN LAST 7 DAYS          DIALING

FIG. 14

| DIALING | | | | | | | |
|---|---|---|---|---|---|---|---|
| AUDITS | | | | | | | |
| SOURCE: BASE, NAME: AUTO_START, SCOPE: STATE, SCOPE KEY: HI | | | | | | | |
| ACTION 1502 | DATE 1504 | TIME 1506 | USER 1508 | VALUE | START DATE | END DATE | DISABLED |
| UPDATED | 07/22/2015 | 02:09:44PM | MEGANJ | 0 | | | |
| | | | FIELD 1510 | NEW 1512 | OLD 1514 | | FALSE |
| | | | VALUE | 0 | 08:00:00AM | | |
| UPDATED | 07/22/2015 | 02:09:44PM | MEGANJ | | 11:59:59PM | | |
| | | | FIELD | NEW | | OLD | FALSE |
| | | | VALUE | 11:59:59PM | | 0 | |
| UPDATED | 07/22/2015 | 02:09:44PM | MEGANJ | 0 | | | |
| | | | FIELD | NEW | | OLD | FALSE |

SAVE | CANCEL

*FIG. 15*

REPORT PARAMETERS

START DATE: 7/23/2015
END DATE: 7/23/2015 — 1602

SELECT BY CLIENT CLASS? Y — 1604
SELECT BY CLIENT? Y — 1606
SELECT BY STATE? Y — 1608
SELECT BY COLLECTION ACTIVITY? Y — 1610
SELECT BY RESTRICTION RESULT? Y — 1612

SHOW DETAILS? N

[ OK ]  [ CANCEL ]

ARTIVA WORKSTATION - PRIMARY RESPONSIBLE PARTY: REMY FOWLER (47)

PREV SEARCH HELP

STANDARD SEARCH PROMPT | MACRO KEYS | PATH: PRIMARY RESPONSIBLE PARTY: REMY FOWLER (47)

RESPONSIBLE PARTY

| | | | BALANCE: 9,001.03 | AGENCY BAL: 9,001.03 |
|---|---|---|---|---|
| NAME: | REMY | FOWLER | SSN: 002-01-0011 | PHONE: REGULAR |
| ADDRESS: | 200 STATE STREET | | DOB: | STATUS: NEWR |
| | PENDLETON | IN  46064 | PH: 765-953-1234 G | FOLLOW-UP: 7/22/2015 |
| SPOUSE: | | | ALT PH: 765-953-1234 G | ACCT REP:    EXT: |

COLLECTION RESTRICTION HISTORY

| DATE | TIME | ACTIVITY | RESTRICTED | RESTRICTED | OVERRIDE REASON | USER |
|---|---|---|---|---|---|---|
| 7/23/2015 | 10:29A | DIAL | Y | Y | REMY REQUESTED THAT I DIAL EARLY TODAY | MMJ |
| 7/22/2015 | 02:09P | DIAL | N | N | | SYS |
| 7/22/2015 | 02:09P | DIAL | Y | N | | SYS |
| 7/22/2015 | 02:09P | DIAL | N | N | | SYS |

ENABLED COLLECTION RESTRICTION CALL STATISTICS

ENTITY: MAY JAILER          ENTITY: 7/23/2015          NEW QUERY

| CALL STAT KEY | DESCRIPTION | STATISTIC VALUE |
|---|---|---|
| ARPOE7 | CALLS TO POE IN LAST 7 DAYS | 0 |
| ARRPC7 | RPCS IN LAST 7 DAYS | 2 |
| ARRPCPOE7 | RPCS AT POE IN LAST 7 DAYS | 0 |

WORK RESPONSIBL... (572)
- HISTORY
- COMBINED HISTORY
- ACTION CODE
- CHECK WRITER
- PREVIOUS ADDRESS
- WORKFLOW
- STATUS
- LETTER
- ARRANGEMENTS
- CALLS
- EMAIL
- TIE HISTORY
- IVR
- VOICE TRAK
- VENDOR STATUS CODE
- ELECTRONIC PAYMENTS
- COMPLAINTS
- RESTRICTIONS

SUPPORT (576)
- TRANSACTION ENTRY
- CUSTOM

SYSTEM AND METHOD FOR MANAGING RESTRICTIONS ON COLLECTION ACTIVITIES

CROSS-REFERENCE TO RELATED APPLICATIONS

This document is a continuation of U.S. patent application Ser. No. 14/839,556, filed Aug. 28, 2015, the contents of which are incorporated herein by reference in their entirety.

FIELD

This document relates to the field of receivables management, and particularly to systems for managing and restricting collection activities.

BACKGROUND

The receivables management industry deals with the collection of unpaid debt in all sectors of the economy (e.g., health care, student loans, credit cards, and retail). While some creditor entities may try to collect their own unpaid debts, typically the delinquent accounts are turned over to a third party debt collector (or collection agency) to manage the process of collecting the unpaid amounts. Such debt collectors employ various strategies to collect on unpaid accounts, such as making multiple phone calls to the debtor (also referred to herein as the "account holder") and sending a series of letters to the debtor's house.

Such actions by a collection agency, creditor, or other entity in an attempt to collect on unpaid accounts may be referred to herein as "collection activities". Examples of collection activities includes making manual and automated telephone calls to the debtor (including telephone calls with pre-recorded messages and telephone calls with live account representatives), sending letters to the debtor, emailing the debtor, texting the debtor, and any of various other communications with the debtor in an attempt to collect on unpaid accounts. However, collection activities may also include actions that do not involve communication with the debtor, such as furnishing data to credit reporting agencies, initiating litigation in the court system to secure judgment, and pursuing garnishment, repossession, or liens. It will be appreciated that the term "collection activities" encompasses, but is not limited to, all of the activities discussed in this paragraph.

Numerous restrictions exist for debt collectors with respect to collection activities that are permissible. These restrictions may relate to any number of different attributes of the account holder, such as the physical residence location of the account holder or the age of the account holder. For example, phone calls to account holders residing in certain states may only be permitted during designated times of the day (e.g., 9 am-5 pm). As another example, the number of calls that may be made to senior citizens may be limited (e.g., no more than two calls to the account holder in one day).

Restrictions on collections activities exist at various levels, including federal and state laws and regulations, non-state restrictions (e.g., restrictions issued for particular geographic regions not limited to states such as zip code or county restrictions from government or other authorities) client-based restrictions, and office policies. Federal restrictions are typically blanket restrictions that apply to all similarly situated account holders regardless of the state or territory in which they live. In addition to federal restrictions, each state also has its own restrictions on collection activities, so activities related to an account holder in one state may be permissible, but the same collection activities in another state may be restricted. For example, it may be permissible to call an account holder in New York at 9 am, while a call to an account holder in West Virginia may not be made until 10 am. On occasion, local collection restrictions are instituted that are non-state restrictions. For example, following emergencies such as natural disasters, collection restrictions may be instituted for individuals living in certain local areas (e.g., restrictions based on zip code). In addition to these governmental restrictions, collection agencies also must be aware of non-governmental restrictions on collection activities, including client-based restrictions (i.e., restrictions based on the collection requirements of a particular creditor) and office-policy restrictions (i.e., restrictions based on the collection policies of the particular debt collection agency).

Managing restrictions is a difficult task for collection agencies. The collection agency must be cognizant of all of the applicable restrictions for each collection activity taken, including all of the applicable federal, state, local, client and office restrictions. Attempting to determine all the applicable restrictions that may apply to a given account holder is not only time consuming, but is uneconomical and increases the cost of each collection. As a result, many collection agencies often commit ignorant violations of restrictions. These violations may result in litigation, fines against the collection agency or loss revenue. At a minimum, violations of restrictions may result in client dissatisfaction or ill-will with consumers in general.

Accordingly, there exists a long felt need for a system to effectively and efficiently receive, manage, implement, and audit restrictions on collections activities for the purposes of improving collection practices. It would be advantageous if such system could increase the effectiveness of collection activities while reducing compliance issues on collections restrictions. It would also be advantageous if such a system could be implemented with relatively little cost to the collection agency and used with existing collection systems.

SUMMARY

In accordance with one exemplary embodiment of the disclosure, there is provided a collection management system a restriction features server including a first memory, the first memory comprising a remote restrictions database defining first collection activity restrictions for a plurality of jurisdictions. The collection management system further includes one or more collection servers configured to connect to the restriction features server, the one or more collection servers including a second memory comprising records, a debtor database, and a local restrictions database, the debtor database defining a plurality of debtors and debts owed by the plurality of debtors, the local restrictions database defining second collection activity restrictions in addition to the first collection activity restrictions, wherein the second memory is updated to include the first collection activity restrictions when the one or more collection servers are connected to the restriction features server. A telephone dialing system is connected to the one or more collection servers, the telephone dialing system configured to access a telephony network and dial one or more telephone numbers, each of the telephone numbers associated with a debtor telephone, wherein access to the telephony network by the telephone dialing system is restricted based on the first collection activity restrictions and the second collection activity restrictions defined in the local restrictions database, and wherein the records of the one or more collection servers include instances of restricted access to the telephony network by the telephone dialing system. A plurality of account representative workstations are connected to the one or more collection servers, each of the plurality of account representative workstations including a graphical user interface configured to (i) display an account screen for one of the plurality of debtors, the account screen comprising data from the debtor database (ii) display a restriction warning on the account screen when access to the telephony network by the telephone dialing system is restricted based on the first collection activity restrictions and the second collection activity restrictions defined in the local restrictions database for the debtor jurisdiction, (iii) display an override option including a window configured to receive a reason for restriction override, (iv) receive the reason for restriction override in the window, and (v) determine whether the entered reason for restriction override is valid by analyzing the reason for restriction override to determine whether the reason includes a predetermined phrase. The telephone dialing system accesses the telephony network and dials the at least one debtor telephone number when the received reason for restriction override is determined to be valid.

In accordance with another exemplary embodiment of the disclosure, there is provided a method of restricting access to a telephony network in a collection management system. The method comprises defining first collection activity restrictions in a remote restrictions database, the first collection activity restrictions related to government-mandated collection activity restrictions for a plurality of jurisdictions. The method further comprises defining second collection activity restrictions in a local restrictions database, the second collection activity restrictions not based on the government-mandated collection activity restrictions for the plurality of jurisdictions. In addition, the method comprises updating the local restrictions database to include the first collection activity restrictions, and prohibiting a telephone dialing system from making a telephone call to a debtor telephone based on the first collection activity restrictions and the second collection activity restrictions, the telephone dialing system configured to access the telephony network and dial a plurality of telephone numbers, each of the plurality of telephone numbers associated with one of a plurality of debtor telephones. Furthermore, the method comprises displaying a restriction notice at a graphical user interface of one of a plurality of account representative workstations connected to the telephone dialing system when the telephone dialing system is prohibited from making the telephone call to the debtor telephone. Thereafter, the method comprises receiving entry of a restriction override request via the one of the plurality of account representative workstations, and determining whether the restriction override request is valid by analyzing an entered reason for restriction override in order to determine whether the reason includes a predetermined phrase. The method also comprises overriding the prohibition of the telephone dialing system from making the telephone call to the debtor telephone when the reason for restriction override is determined to be valid, and reporting the prohibition of the telephone dialing system from making the telephone call to the debtor telephone.

In yet another exemplary embodiment of the disclosure, there is provided a collection management system comprising a restriction features server including a first memory, the first memory comprising a remote restrictions database defining first collection activity restrictions for a plurality of jurisdictions. The collection management system further comprises one or more collection servers configured to connect to the restriction features server, each collection server including a second memory comprising records, a debtor database, and a local restrictions database, the debtor database defining a plurality of debtors and debts owed by the plurality of debtors, and the local restrictions database defining second collection activity restrictions in addition to the first collection activity restrictions, wherein the second memory is updated to include the first collection activity restrictions when the collection server is connected to the restriction features server. The collection management system further comprises a communication system connected to the one or more collection servers, the communication system configured to access a public network and dial one or more telephone numbers, each of the telephone numbers associated with a debtor telephone, wherein access to the public network by the communication system is restricted based on the first collection activity restrictions and the second collection activity restrictions defined in the local restrictions database, and wherein the records of the one or more collection server include instances of restricted access to the public network by the communication system. The collection management system also comprises a plurality of automated workstations connected to the one or more collection servers, each of the plurality of automated workstations including a graphical user interface configured to (i) display an account screen for one of the plurality of debtors, the account screen comprising data from the debtor database, (ii) display a restriction warning on the account screen when access to the public network by the communication system is restricted based on the first collection activity restrictions and the second collection activity restrictions defined in the local restrictions database for the debtor jurisdiction, (iii) display an override option including a window configured to receive a reason for restriction override, (iv) receive the reason for restriction override in the window, and (v) determine whether the entered reason for restriction override is valid. The communication system is configured to access the public network and dial the at least one debtor telephone number when the received reason for restriction override is determined to be valid.

The above described features and advantages, as well as others, will become more readily apparent to those of ordinary skill in the art by reference to the following detailed description and accompanying drawings. While it would be desirable to provide a collection management system that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 5 shows an exemplary screen shot of an account screen of the account representative workstation of FIG. 4;

FIG. 6 shows another exemplary screen shot of the account screen of the account representative workstation of FIG. 4;

FIG. 7 shows an exemplary screen shot providing an alert for the account representative workstation of FIG. 4;

FIG. 8 shows an exemplary screen shot providing a request result for the account representative workstation of FIG. 4;

FIG. 9 shows an exemplary screen shot of a safe calling hours screen for the restriction features server of FIG. 2;

FIG. 11 shows an exemplary screen shot of a licensing restrictions screen for the collection server of FIG. 3;

FIG. 14 shows a restriction category box associated with the restriction selection box of FIG. 13;

FIG. 15 shows an exemplary screen shot of an audit screen for the collection server of FIG. 3;

FIG. 16 shows an exemplary screen shot of an audit report request screen for the collection server of FIG. 3;

FIG. 17 shows yet another exemplary screen shot of an account screen of the account representative workstation of FIG. 4 including a restriction warning box;

FIG. 18 shows an exemplary screen shot of the account screen of FIG. 17 including a note box having a restriction override box;

FIG. 19 shows an exemplary screen shot of the account screen of FIG. 17 including a collection restrictions history box; and FIG. 20 shows an exemplary screen shot of a collection restriction history report for the collection server of FIG. 3.

DESCRIPTION

Figure 1:
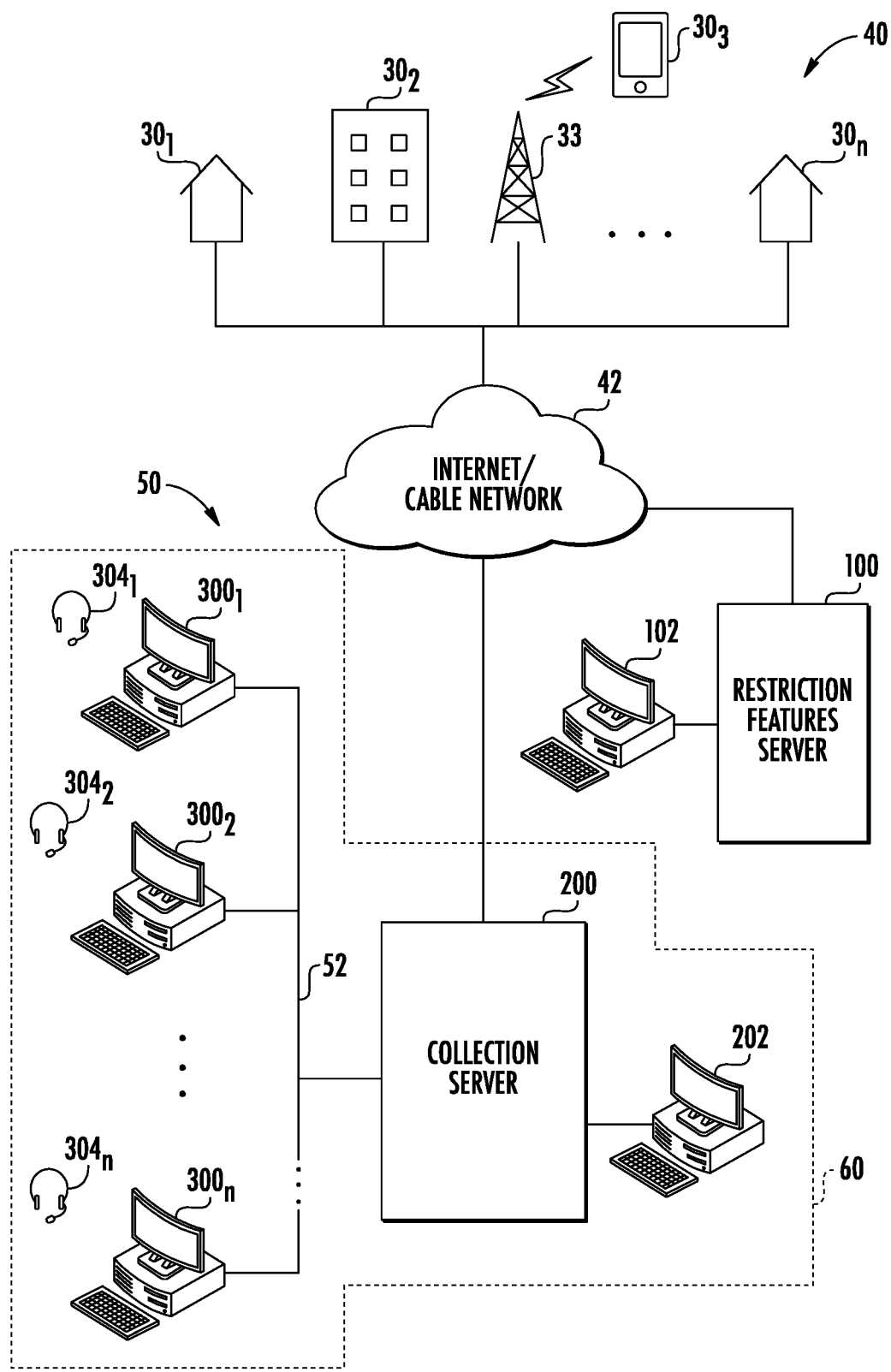
FIG. 1 shows a topology diagram of an exemplary collection management system connected to a telephony network.

With reference to FIG. 1, an exemplary topology diagram for a collection management system 50 is shown. The collection management system 50 includes a plurality of systems and components in wired or wireless communication via a network 42. The systems and components of the collection management system 50 include a restriction features server 100 and an associated restriction feature workstation 102, a collection server 200 and an associated administrator workstation 202, and a plurality of account representative workstations $300_1$-$300_n$. The collection management system 50 is connected to a telephony network 40. The collection management system 50 includes various data storage devices comprising information related to creditors, debtors, accounts, collection activities, and related collection restrictions. Software applications for the collection management system 50 may be stored on the restriction features server 100, the collection server 200, as well as the account representative workstations $300_1$-$300_n$. As will be explained herein, the collection management system 50, among other things, facilitates and helps manage communications between the account representatives at the account representative workstations $300_1$-$300_n$, and debtors associated with a number of telephony devices $30_1$-$30_n$ connected to the telephony network 40.

The telephony devices $30_1$-$30_n$ may be provided in any of various forms. For example, in FIG. 1, the telephony devices include a land line for a debtor's residence $30_1$, a landline for a debtor's business $30_2$, and a debtor's mobile phone $30_3$ connected to the telephony network 40 via one or more antennas 33 of a cellular telephone network. Any of various other telephony devices and communications techniques are possible using the telephony network 40. For example, communications need not be limited to voice communications, but may also be provided by text, email, or other types of communication using the telephony network 40. Also, in the embodiment of FIG. 1, the network connecting the telephony network 40 and the collection management system 50 is the internet 42. However, it will be recognized that the network providing communications between the telephony network and the collection management system 50 may be provided in any of various forms such as a cable network, a fiber network, or the telephony network itself.

With continued reference to FIG. 1, it will be noted that the collection management system 50 includes a number of components housed at remote locations. In particular, the restriction features server 100 and restriction features workstation 102 are provided at a first location that is separate from a second location where the collection server 200, the administrator workstation 202, and the plurality of account representative workstations $300_1$-$300_n$ are located. In this embodiment, the collection server 200, the administrator workstation 202, and the plurality of account representative workstations $300_1$-$300_n$ are all housed at a single facility 60 (e.g., within a single building or upon a designated property having a single owner). The collection server 200, the administrator workstation 202, and the plurality of account representative workstations $300_1$-$300_n$ are all connected together using a local area network (e.g., LAN 52) for the facility 60. LAN 52 may be provided in any of various forms with any of various types of connections between the components. For example, the components may be connected using a wired network or a wireless network (e.g., a WiFi network), using secured network connections. While FIG. 1 shows one exemplary embodiment of the collection management system, it will be recognized that other arrangements are possible. For example, in other embodiments one or more of the collection server 200, the administrator workstation 202, and the plurality of account representative workstations $300_1$-$300_n$ may be housed at separate facilities and connected using a larger wide area network, such as the internet 42. Alternatively, in another alternative embodiment the restriction features server 100, the collection server 200, the administrator workstation 202, and the plurality of account representative workstations $300_1$-$300_n$ are all housed at a single facility and connected together using secured network connections. Also, in at least one alternative embodiment, two or more of the restriction features server 100, restriction features workstation 102, the collection server 200, administrator workstation 202, and the account representative workstations $300_1$-$300_n$ may be combined into a single server or other single computer device. Accordingly, it will be recognized that while one exemplary arrangement for the systems and components of the collection management system is shown in FIG. 1, various alternative arrangements are possible.

In the following pages, the general arrangement of an exemplary collection management system 50 is explained, including the configuration of the restriction features server 100, the collection server 200, and the account representative workstations 300. Thereafter, the general operation of the collection management system is discussed.

FIG. 1 is a diagrammatic representation of one embodiment of the collection management system 50 in a networked computing environment. For purposes of clarity, the restriction features server 100 is shown connected via the internet 42 to a single collection server 200 and the associated account representative workstations $300_1$-$300_n$. However, it will be recognized that the restriction features server 100 may be connected to any number of collection servers at different collection agency sites or other locations. The client and server computers shown in the figures represent an exemplary hardware configuration of data processing systems that are capable of bi-directionally communicating with each other over a private network or a public network such as the internet. The methods and functions of each of the various computers described herein may be distributed and performed by multiple computers in an enterprise or network computing environment, such as a local area network, wide area network, or the cloud. Accordingly, steps, operations, methods, routines or portions thereof described herein may be implemented on one computer or shared among two or more computers. Communications between computers implementing embodiments of the invention can be accomplished using any electronic, optical, radio frequency signals, or other suitable methods and tools of communication in compliance with network and other communications protocols. Accordingly, those skilled in the art will appreciate that various alternative configurations for the computers described herein are possible.

Each of the computers described in FIGS. 2-4 below including the restriction features server 100, the collection server 200, and the account representative workstation 300, include various electronic components, including processing components, memory components and I/O components. The processing components typically include a central processing unit as well as other processors. A "processor" includes any hardware system, hardware mechanism or hardware component that processes data, signals or other information. A processor can include a system with a central processing unit, multiple processing units, dedicated circuitry for achieving functionality, or other systems. The memory components may be provided in any of various forms such as ROM, RAM, hard drives, discs, flash memory, or any of various other data storage devices. The memory includes media that can be read by a processor, and therefore include computer-readable storage media. These memories may be internal or external to computers. The I/O devices typically include a keyboard, monitor, electronic pointing device, printer, and speakers.

In at least one embodiment, portions of the system and methods described herein may be implemented in suitable software code that may reside within the memory. A computer program product implementing an embodiment disclosed herein may therefore comprise one or more computer-readable storage media storing computer instructions translatable by a processor to provide an embodiment of a system or perform an embodiment of a method disclosed herein. Computer instructions may be provided by lines of code in any of various languages as will be recognized by those of ordinary skill in the art. A "computer-readable medium" may be any type of data storage medium that can store computer instructions, including, but not limited to read-only memory (ROM), random access memory (RAM), hard disks (HD), data cartridges, data backup magnetic tapes, floppy diskettes, flash memory, optical data storage, CD-ROMs, or the like. The computer readable medium can be, by way of example, only but not by limitation, an electronic, magnetic, optical, electromagnetic, infrared, or semiconductor system, apparatus, system, device, or computer memory.

It will be understood for purposes of this disclosure that a service or module is one or more computer devices, configured (e.g., by a computer process or hardware) to perform one or more functions. A service may present one or more interfaces which can be utilized to access these functions. Such interfaces include APIs, interfaces presented for a web services, web pages, remote procedure calls, remote method invocation, etc.

Restriction Features Server

Figure 2:
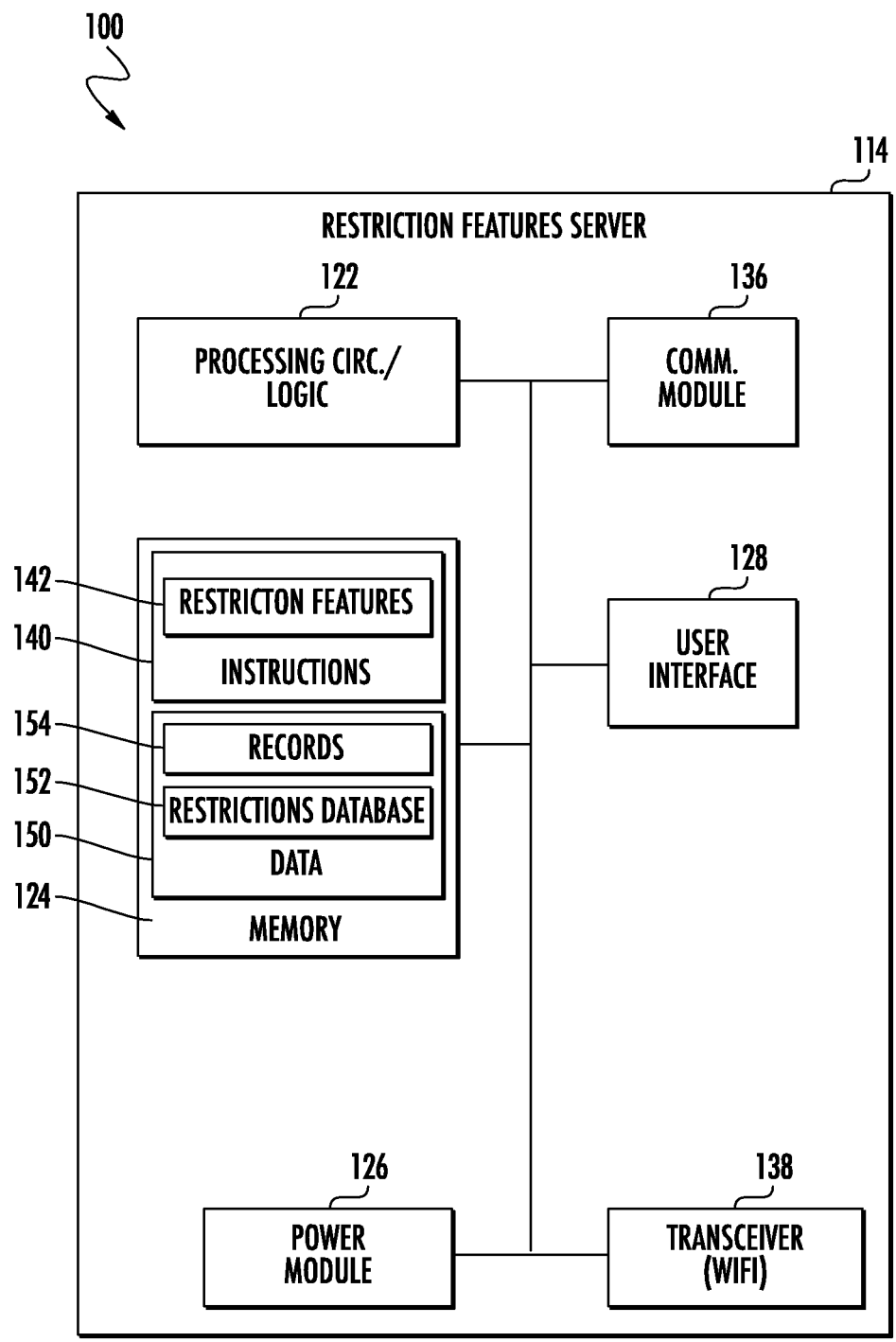
FIG. 2 shows a block diagram of a restriction features server of the exemplary collection management system of FIG. 1.

With reference now to FIG. 2, a block diagram of an exemplary embodiment of the restriction features server 200 of FIG. 1 is shown. It should be appreciated that the embodiment of the restriction features server 200 shown in FIG. 2 is only one exemplary embodiment of a restriction features server 200. As such, the exemplary embodiment of the restriction features server 200 of FIG. 2 is merely representative of any of various manners or configurations of restriction features servers that are operative in the manner set forth herein.

The restriction features server 100 of FIG. 2 includes a housing, cabinet or the like 114 that is configured in a typical manner for a server or related computing device. The restriction features server 100 includes processing circuitry/logic 122, memory 124, a power module 126, a user interface 128, a network communications module 136, and the wireless transceiver 138.

The processing circuitry/logic 122 is operative, configured and/or adapted to operate the restriction features server 100 including the features, functionality, characteristics and/or the like as described herein. To this end, the processing circuit 122 is operably connected to all of the elements of the restriction features server 100 described below. The processing circuitry/logic 122 is typically under the control of program instructions 140, programming software or firmware contained in memory 124. The program instructions include a restriction features app 142 as explained in further detail below. In addition to storing the instructions 140, the memory also stores data 150 for use by the restriction features app 142. The data 150 includes a restrictions database 152, which includes definitions of restrictions across any of multiple jurisdictions or entities including federal, state, non-state, client and office-policy restrictions. Exemplary restrictions defined within the restrictions database are described in further detail below. The data 150 also includes records 154 which include information concerning changes made to the data 150 or the instructions 140 by any of various parties logged onto the restriction feature workstation 102 (shown in FIG. 1). In the embodiment provided herein, all databases, including databases 152 and 154 are relational databases. However, it will be recognized that the databases may also be provided in other forms, such as object-oriented databases, or any of various other database configurations deemed appropriate by the designer of the collection management system 50.

With continued reference to FIG. 2, the power module 126 of the restriction features server 100 is operative, adapted and/or configured to supply appropriate electricity to the restriction features server 100 (i.e., including the various components of the restriction features server 100). The power module 126 may operate on standard 120 volt AC electricity, but may alternatively operate on other AC voltages or include DC power supplied by a battery or batteries.

The network communication module 136 of the restriction features server 100 allows for communication with any of various remote computers over the internet 42 (e.g., communication with collection server 200). The network communications module 136 may further allow for communication with any of various local computers housed in the same facility (e.g., via a LAN). To this end, the network communication module 136 may include a plurality of ports connected to any of various networks using secured network connections.

The restriction features server 100 may be accessed locally. To facilitate local access, the restriction features server 100 includes an interactive user interface 128. Via interface 128, the user may control the collection of data from and storing of data to the memory 124. In at least one embodiment, the user interface 128 of the restriction features server 100 is provided by the restriction features workstation 102. As shown in FIG. 1, the restriction features workstation 102 may suitably include an LCD type screen or the like, a mouse or other pointing device, a keyboard or other keypad, speakers, and a microphone, as will be recognized by those of ordinary skill in the art. The restriction features workstation 102 is configured to provide a restriction features administrator or other user with access to the restriction features app 142. Accordingly, the restriction features workstation 102 is also configured to allow the user to amend, manipulate and display information within the restrictions database 152.

As explained above, communications with the restriction features server 100 may occur via wired communications (e.g., via communications module 136) and via local access (e.g., via the user interface 128). In addition, the restriction features server 100 is also equipped with the ability to communicate with remote devices via the wireless transceiver 138. Communications via the wireless transceiver 138 may be accomplished using any of various known communications protocols. In the embodiment of FIG. 2, the wireless transceiver identified as a WiFi transceiver, but it will be recognized that the wireless transceiver could use a different communications protocol, such as Bluetooth® or ZigBee® protocols.

As mentioned above, the memory 124 includes various programs and other instructions 140 that may be executed by the processor 122. In particular, the memory 124 of the restriction features server 100 of FIG. 2 includes a restriction features application 142. The restriction features app 142 is configured to control the restriction features server 100 in order to allow a human administrator or other user to input, define, and update restricted collection activities as defined by any of various entities, including federal and state governments, regulatory bodies and authorities, clients, and individual offices. Execution of the restriction features application 142 by the processor 122 results in signals being sent to and received from the user interface 128 to allow a user to input, define and update the information in the restrictions database. Various aspects of the restriction features app 142 are explained in further detail below. For example, the restriction features app 142 is configured to provide various graphical views and screen arrangements to be displayed to an administrator or other user via the restriction features workstation 102. Examples of such screens for display on the restriction features workstation 102 are provided in FIGS. 9, 10, 13 and 14, discussed in further detail below.

In addition to the instructions 140, the memory 124 also includes data 150. The data 150 includes a restrictions database 152 and records 154. The definitions of the restricted activities defined by the user via the restriction features application 142 are generally retained in the memory 124 in the restrictions database 152. As mentioned previously, the data in the restrictions database 152 may include defined restrictions across any of multiple jurisdictions or entities including federal, state, non-state, and client. The defined federal and state restrictions are generally government-mandated collection activity restrictions. As one example, restrictions on collection calling hours within a particular state may be defined in the restrictions database (e.g., only calls between 9 am and 5 pm in Indiana). The defined non-state restrictions are often based on a geographic area (e.g., postal codes), but are typically not government mandated restrictions. The defined client restrictions are typically unique to particular creditors or creditors in certain industries.

The records 154 in the memory 124 include current and historical data stored by the restriction features server 100 in association with operation of the restriction features server 100 and manipulation of data within the restrictions database 152. For example, the records 154 may include information concerning who changed a restriction definition in an particular state, along with information about when and why the user performed this action (e.g., the user may be required to provide a reason why a restriction definition was changed within the restrictions database 152). The records 154 may also include other information related to the control and operation of the restriction features 142, including statistical, logging, licensing, and historical information.

While the restriction features server 100 has been explained in the foregoing embodiment as housing the restriction features application 142 and the restriction database 152, it will be recognized that these components may be retained in other locations in association with the collection management system 50. For example, in at least one embodiment, the restriction features application 142 and the restrictions database 152 could all be retained by the collection server. Accordingly, it will be recognized that the description of the restriction features server 100 of FIG. 2 is but one exemplary embodiment of a restriction features server 100 within the collection management system 50.

Collection Server

Figure 3:
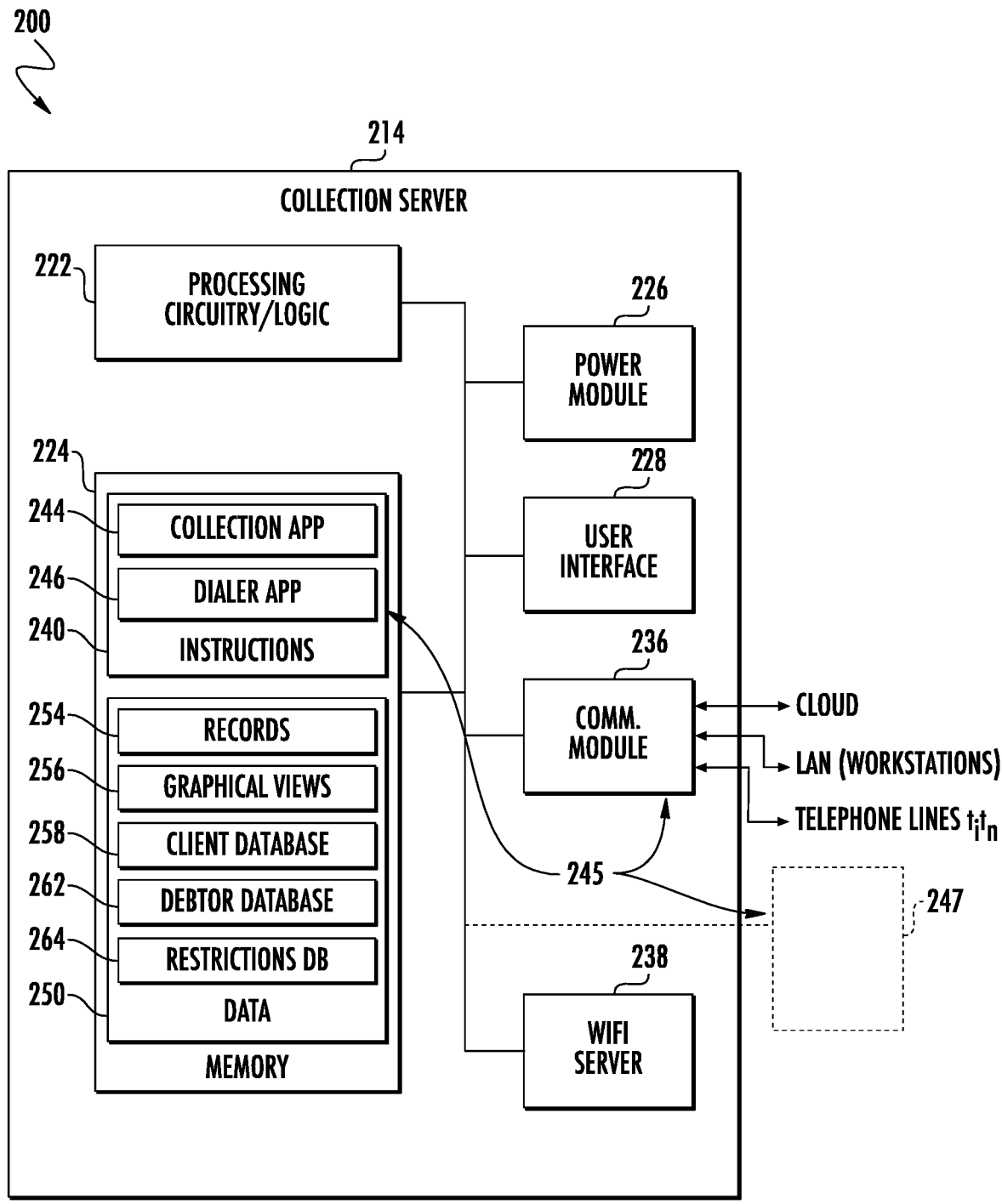
FIG. 3 shows a block diagram of a collection server of the exemplary collection management system of FIG. 1.

With reference now to FIG. 3, a block diagram of an exemplary embodiment of the collection server 200 of FIG. 1 is shown. It should be appreciated that the embodiment of the collection server 200 shown in FIG. 3 is only one exemplary embodiment of a collection server 200. As such, the exemplary embodiment of the collection server 200 of FIG. 3 is merely representative of any of various manners or configurations of collection servers that are operative in the manner set forth herein.

The collection server 200 of FIG. 3 includes a housing, cabinet or the like 214 that is configured in a typical manner for a server or related computing device. The collection server 200 includes processing circuitry/logic 222, memory 224, a power module 226, a user interface 228, a network communications module 236, and a wireless transceiver 238.

The processing circuitry/logic 222 is operative, configured and/or adapted to operate the collection server 200 including the features, functionality, characteristics and/or the like as described herein. To this end, the processing circuit 222 is operably connected to all of the elements of the collection server 200 described below. The processing circuitry/logic 222 is typically under the control of program instructions 240, programming software or firmware contained in memory 224. The program instructions include a collection app 244 as explained in further detail below. In addition to storing the instructions 240, the memory 224 also stores data 250 for use by the collection app 244. The data 250 includes records 254, a graphical views database 256, a client database 258, a debtor database 262, and a restrictions database 264.

With continued reference to FIG. 3, the power module 226 of the collection server 200 is operative, adapted and/or configured to supply appropriate electricity to the collection server 200 (i.e., including the various components of the collection server 200). The power module 226 may operate on standard 120 volt AC electricity, but may alternatively operate on other AC voltages or include DC power supplied by a battery or batteries.

The network communication module 236 of the collection server 200 allows for communication with any of various devices using various means. In particular, the network communications module 236 includes a wide area network port that allows for communications with remote computers over the internet 42 (e.g., communication with restriction features server 100). The network communications module 236 further includes a local area network port that allows for communication with any of various local computers housed in the same facility (e.g., communications with account representative workstations $300_1$-$300_n$, as shown in FIG. 1). In at least one embodiment, all connections to the collection server are made using secured network connections without any internet connections. Additionally, the network communications module 236 includes a number of ports that may be connected to an associated number of different telephone lines $t_1$-$t_n$. As described in further detail below, the network communications module 236 may serve as a dialing device for a telephone dialing system 245. The telephone dialing system 245 is configured to access the telephony network 40 and dial one or more telephone numbers. The telephone dialing system 245 includes both a dialing device as well as instructions for operation of the dialing device using one or more of various dialing platforms, such as an autodialer, manual contact platform, private branch exchange (PBX), etc. In the embodiment of FIG. 3, the dialing device is provided by the electronic components of the communications module 236, and the instructions for operating the dialing device are provided by the dialing app 246. In at least one alternative embodiment, the dialing device may be provided as a standalone box 247 (illustrated in dotted lines in FIG. 3) that is connected to an I/O port of the collection server 200 and controlled by the instructions 240 within the collection server 200.

The collection server 200 may be accessed locally. To facilitate local access, the collection server 200 includes an interactive user interface 228. Via interface 228, the user may execute the instructions, including the collection app 244 and the dialing app 246, and may collect data from and store data to the memory 224. In at least one embodiment, the user interface 228 of the collection server 200 is provided by the administrator workstation 202. As shown in FIG. 1, the administrator workstation 202 may suitably include an LCD type screen or the like, a mouse or other pointing device, a keyboard or other keypad, speakers, and a microphone, as will be recognized by those of ordinary skill in the art. The administrator workstation 202 is configured to provide a collection administrator or other user with access to administrative features within the collection app 244. Accordingly, the administrator workstation 202 is also configured to allow the user to amend, manipulate and display information contained within the memory.

As explained above, communications with the collection server 200 may occur via wired communications (e.g., via communications module 236) and via local access (e.g., via the user interface 228). In addition, the collection server 200 is also equipped with the ability to communicate with remote devices via the wireless transceiver 238. Communications via the wireless transceiver 238 may be accomplished using any of various known communications protocols. In the embodiment of FIG. 3, the wireless transceiver identified as a WiFi transceiver, but it will be recognized that the wireless transceiver could use a different communications protocol.

As mentioned above, the memory 224 includes various programs and other instructions 240 that may be executed by the processor 222. In particular, the memory 224 of the collection server 200 of FIG. 3 includes the collection application 244 and the dialing app 246. The collection app 244 is configured to control the collection server 200 in order to allow a human administrator or other user to manage collection activities for a creditor or collection agent. Administrative features of the collection app 244 may only be accessed by the administrator or other authorized user via the administrator workstation 202 shown in FIG. 1. Other features of the collection app 244 related to contacting debtors and related collection activities are available via the account representative workstations $300_1$-$300_n$ shown in FIG. 1. Execution of the collection application 244 by the processor 222 results in signals being sent to and received from the user interface 228 and the communications module 236 to allow a user receive and update the information in the debtor database 262. Various aspects of the collection application 244 are explained in further detail below. For example, the collection app 244 is configured to provide various graphical views and screen arrangements to be displayed to an administrator, account representative or other user. Examples of such screens for display via the administrator workstation 202 are provided in FIGS. 11, 12, 15 and 16, and examples of screens for display via the account representative workstation are provided in FIGS. 5-8 and 17-19, as discussed in further detail below. An exemplary collection app 244 is the ARTIVA RM™ collection software available from Ontario Systems LLC of Muncie, Ind. One description of an exemplary collection app for managing and collecting receivables is disclosed in U.S. patent application Ser. No. 14/215,750, filed Mar. 17, 2014, and published as United States publication no. 2015/0088706, the content of which is incorporated herein by reference in its entirety. While a brief description of various features of the exemplary collection app 244 is provided in the paragraphs below, it should be appreciated that collection management system 50 described herein is only an exemplary form or configuration for the collection management system 50.

In addition to the collection app 244, the memory also includes the dialing app 246. The dialing app 246 is one component of the telephone dialing system 245. As discussed previously, the telephone dialing system includes a dialing device comprising a set of electronic components and other hardware configured to make actual phone calls over a telephone line (e.g., using the communications module 236), and instructions (e.g., the dialing app 246) that cause the hardware to make physical telephone calls to one telephone number or any of a plurality of telephone numbers. Whether a call is made to one number or a plurality of telephone numbers will depend on the dialing platform of the dialing device (e.g., autodialer, manual contact platform, etc.). In at least one embodiment, the telephone dialing system 245 comprises a software dialer that generates voice over IP ("VoIP") calls via a connection to the internet 42. In at least one alternative embodiment, the telephone dialing system 245 includes hardware that is physically connected to telephone lines (e.g., cable or fiber lines) in the telephony network 40. Once the call has been answered, the dialing app 246 may be used to connect the answered call to a live person (e.g., a person at either the administrative workstation 202 or the account representative workstations 300₁-300ₙ shown in FIG. 1). In at least one embodiment, the dialing app 246 utilizes a manual contact platform such that the telephone dialing system 245 only makes telephone calls to a particular telephone number when instructed to do so by a user. In another embodiment, the dialing app 246 utilizes an autodialer platform wherein the telephone dialing system 245 is configured to go through a list of telephone numbers and automatically place a call to each of these telephone numbers. Alternatively, in another embodiment, the telephone dialing system 245 may comprise two different, distinct systems: a first telephone dialing system utilizes a manual contact platform that lacks the capacity to predictively dial, does not store numbers and requires human intervention to place a call; a second telephone dialing system utilizes a separate autodialer platform that is configured to go through a list of telephone number and automatically place a call to a series of telephone numbers. The collection server 200 determines the appropriate platform for the telephone dialing system (whether manual contact switch or autodialer) at the point of making the call based on the type of queue the account representative is working, whether the telephone number is assigned to a cellular network telephone, and whether the consumer owning the cellular telephone has provided consent to call the cellular telephone with an autodialer.

In at least one embodiment, the autodialer may be configured for operation in a predictive dialer mode or a power dialer mode. In the predictive dialer mode, the dialing app 246 uses real-time analysis to determine the optimal time to dial additional numbers and connects account representatives to any answered call. In the power dialer mode, the dialing app 246 simply dials a pre-set number of lines when an agent finishes a previous call. Another feature that may be provided by the dialing app 246 in the autodialer mode is the ability to analyze incoming audio and distinguish live human pick-ups from answering machines. As discussed previously, the dialing app 246 is controlled in a manner such that all applicable federal, state, non-state, client, or office-based restrictions on collection activity are upheld. One example of a federal law placing restrictions on autodialers is the Telephone Consumer Protection Act of 1991. The restriction database 264 provides an appropriate set of restrictions for a specific call (e.g., safe time to call). In some instances, these restrictions may depend on the dialing device used and the associated dialing platform (e.g., manual contact platform or autodialer calls). Accordingly, it will be recognized that restrictions may be based on whether a collection activity is either a "manual call" (i.e., the telephone dialing system utilizes the manual contact platform) or an "autodialer call" (i.e., the telephone dialing system utilizes an autodialer). In either case, the dialing app 246 utilizes information in the restrictions database 264 to apply the restriction to the collection activity.

With continued reference to FIG. 3, in addition to the instructions 240, the memory 224 also includes data 250. The data 250 includes records 254, graphical views 256, a client database 258, a debtor database 262, and a restrictions database 264. The records 254 include current and historical data stored by the collection server 200 in association with operation of the collection server 200, execution of the collection app 244 and the dialing app 246, and manipulation of data 250 within the memory 224. For example, the records 254 may include information concerning when and why an administrator or other user performed a particular action (e.g., the user may be required to provide a reason why a restriction definition was changed within the restrictions database 264). The records 254 may also include other information related to the control and operation of the collection server 200, including statistical, logging, licensing, and historical information.

The graphical views 256 provide various screen arrangements to be displayed to the user in on the administrator workstation 202 or one of the account representative workstations 300₁-300ₙ shown in FIG. 1. Examples of such screens for display on the administrator workstation 202 or the account representative workstations 300₁-300ₙ are provided in FIGS. 5-8 and 11-19, discussed in further detail below.

The client database 258 includes data related to the creditors within the collection management system 50. The records and data within the client database 258 may include any of various fields or other information such as creditor name, address, telephone numbers or other contact information, accounts associated with the creditor, total amount owed to creditor, and any of various other pieces of information associated with the creditor.

The debtor database 262 includes information about each account within the collection management system 50. The records and data within the debtor database 262 may include any of various fields or other information such as debtor name, address, telephone numbers (e.g., home number, work number, mobile number) or other contact information, place of employment, delinquent debts owed by the debtor, account numbers, social security number, date of birth, total amount owed by the debtor, and any of various other pieces of information associated with the debtor or an account held by the debtor.

The restrictions database 264 generally includes a set of restriction definitions that has been received from the restrictions database 152 of the restriction features server 100. However, the restrictions database 264 also includes additional restrictions, as will be described in further detail below. The restriction definitions in the restrictions database 264 may include defined restrictions across any of multiple jurisdictions or entities including federal, state, non-state, client and office-policy restrictions. The defined federal and state restrictions are generally government-mandated collection activity restrictions. As one example, restrictions on collection calling hours within a particular state may be defined in the restrictions database (e.g., only calls between 9 am and 5 pm in Indiana). The defined non-state restrictions are often based on a geographic area (e.g., municipalities and postal codes), and may or may not be government mandated restrictions. The defined client restrictions are typically unique to particular creditors or creditors in certain industries. The defined office-policy restrictions are typically unique to a particular credit agency or other office where the collections app 244 is located. The collections app 244 uses the data in the restrictions database 264 to prevent certain collection activities. For example, the collections app 244 restricts access to the telephony network 40 by the telephone dialing system 245 when collection activities are attempted that are restricted within the restrictions database.

While the collection server 200 has been explained in the foregoing embodiment as housing the collection application 244, the dialing app 246 and the various records and databases in the memory 224, it will be recognized that these components may be retained in other locations in association with the collection management system 50. For example, in at least one embodiment, the telephone dialing system 245 including the dialing app 246 and any related hardware could be included as part of each individual account representative workstation 300₁-300ₙ. Accordingly, it will be recognized that the description of the collection server 200 of FIG. 3 is but one exemplary embodiment of a collection server 200 within the collection management system 50.

Account Representative Workstation

Figure 4:
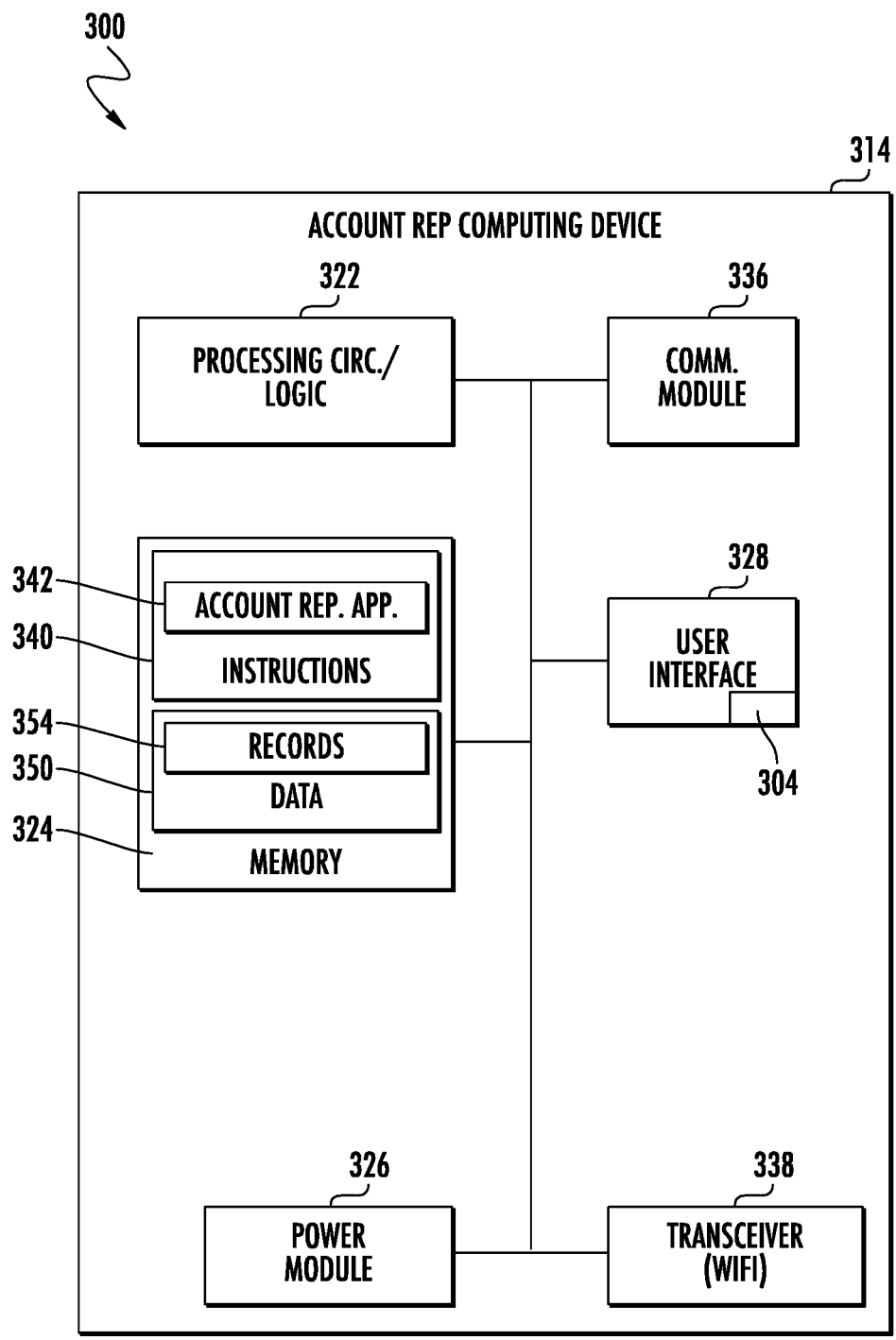
FIG. 4 shows a block diagram of an account representative workstation of the exemplary collection management system of FIG. 1.

With reference now to FIG. 4, a block diagram of an exemplary embodiment of one of the account representative workstations 300₁-300ₙ of FIG. 1 is shown. It should be appreciated that the embodiment of the account representative workstation 300 shown in FIG. 4 is only one exemplary embodiment of an account representative workstation 300. As such, the exemplary embodiment of the account representative workstation 300 of FIG. 4 is merely representative of any of various manners or configurations of restriction features servers that are operative in the manner set forth herein.

The account representative workstation 300 of FIG. 4 includes a housing, cabinet or the like 314 that is configured in a typical manner for a desktop computer, laptop computer, or related computing device. The account representative workstation 300 includes processing circuitry/logic 322, memory 324, a power module 326, a user interface 328, a network communications module 336, and a wireless transceiver 338.

The processing circuitry/logic 322 is operative, configured and/or adapted to operate the account representative workstation 300 including the features, functionality, characteristics and/or the like as described herein. To this end, the processing circuit 322 is operably connected to all of the elements of the account representative workstation 300 described below. The processing circuitry/logic 322 is typically under the control of program instructions 340, programming software or firmware contained in memory 324. The program instructions include an account representative app 342 as explained in further detail below. In addition to storing the instructions 340, the memory 324 also stores data 350 for use by the account representative app 342.

With continued reference to FIG. 4, the power module 326 of the account representative workstation 300 is operative, adapted and/or configured to supply appropriate electricity to the account representative workstation 300 (i.e., including the various components of the account representative workstation 300). The power module 326 may operate on standard 120 volt AC electricity, but may alternatively operate on other AC voltages or include DC power supplied by a battery or batteries.

The network communication module 336 of the account representative workstation 300 allows for communication with any of various devices using various means. In particular, the network communications module 336 includes a local area network port that allows for communications with the collection server 200 using secured network connections. In the embodiment disclosed herein, the account representative workstation 300 receives instructions or other data associated with the collection application 244 (see FIG. 2) via a local area network. This data provides the user with access to the account representative features of the collection app 244, but does not provide the user with access to administrative features of the collection app 244. The network communications module 336 may also include a wide area network port that allows for communication with any of various remote computers via the internet (e.g., communications with the restriction features server 100). Additionally, in at least one embodiment, the network communications module 336 may include a number of ports that are connected to a plurality of telephone lines. As described previously, in at least one embodiment, the account representative workstation 300 includes a telephone dialing system configured to control operation of a plurality of telephone lines and calls made upon such telephone lines.

The account representative workstation 300 includes an interactive user interface 328 that allows an account representative or other user to interact with the account representative workstation 300. The user interface 328 may suitably include any number of I/O devices, such as an LCD type screen or the like, a mouse or other pointing device, a keyboard or other keypad, as will be recognized by those of ordinary skill in the art. Furthermore, the user interface includes a headset 304, which provides a microphone and speakers for the account representative. The headset 304 allows the account representative to handle calls made with the telephone dialing system 245 in a hands-free manner, thus allowing the account representative to manipulate the keyboard, mouse or other interface devices during calls.

As explained above, communications with the account representative workstation 300 may occur via wired communications (e.g., via communications module 336) and via local access (e.g., via the user interface 328). In addition, the account representative workstation 300 is also equipped with the ability to communicate with other network devices via the wireless transceiver 338. Communications via the wireless transceiver 338 may be accomplished using any of various known communications protocols. In the embodiment of FIG. 4, the wireless transceiver identified as a WiFi transceiver, but it will be recognized that the wireless transceiver could use a different communications protocol.

The memory 324 includes various programs and other instructions 340 that may be executed by the processor 322. In particular, the memory 324 of the account representative workstation 300 of FIG. 4 includes an account representative application 342. The account representative app 342 is configured to control the account representative workstation 300 in order to allow an account representative or other human user to manage collection activities for a creditor or collection agent. The account representative app 342 may be configured to merely receive instructions from the collection server which provides the user with a limited set of features from the associated collection app 244 (e.g., the account representative app 342 only allows account representative features from the collection app 244 to be run on the account representative workstation 300). Execution of the account representative application 342 by the processor 322 results in signals being sent to and received from the user interface 328 and the communications module 336 to allow the account representative to perform collection activities and store data in the memory 324. Various aspects of the account representative application 342 are explained in further detail below. The account representative app 342 is configured to provide various graphical views and screen arrangements to be displayed to an administrator, account representative or other user. Examples of such screens for display via the account representative workstation 300 are provided in FIGS. 5-8 and 17-19, as discussed in further detail below.

In addition to the account representative app 342, the memory also includes data 350. The data 350 includes records 354. The records 354 include current and historical data stored by the account representative workstation 300 in association with operation of the account representative workstation 300, execution of the account representative app 342 and collection activities in general. For example, the records 354 may include information concerning when and why an account representative or other user bypassed certain restrictions (e.g., the user may be required to provide a reason why a restriction was not followed in a particular instance). The records 354 may also include other information related to the control and operation of the account representative workstation, including statistical, logging, licensing, and historical information.

While the account representative workstation 300 has been explained in the foregoing embodiment as housing the account representative app 342 and the various records and databases in the memory 324, it will be recognized that these components may be retained in other locations in association with the collection management system 50. For example, in at least one embodiment, the account representative workstation 300 may be combined with the administrator workstation 202. Accordingly, it will be recognized that the description of the account representative workstation 300 of FIG. 4 is but one exemplary embodiment of an account representative workstation 300 within the collection management system 50.

Account Screen for Account Representative Workstation

Figure 5:
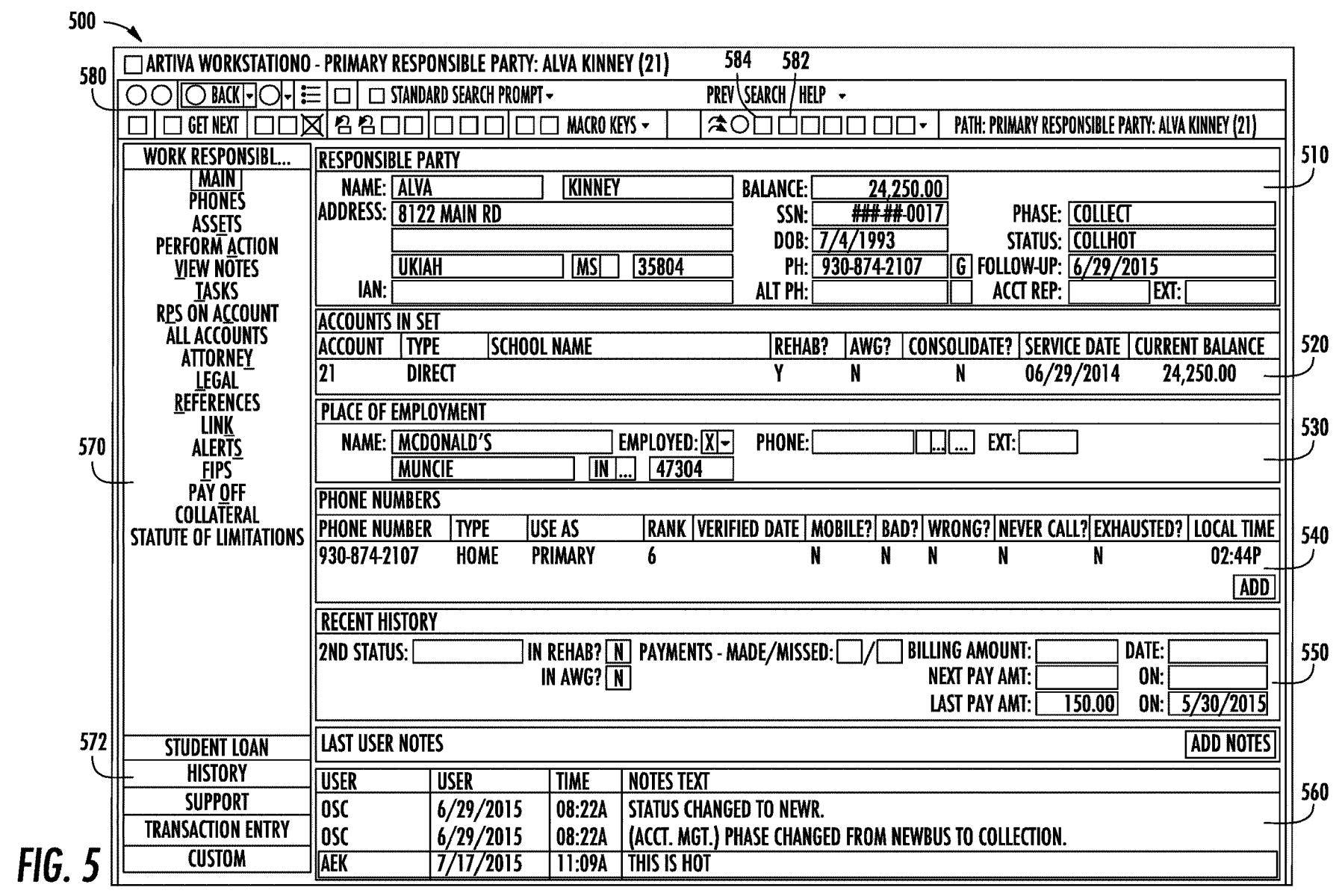

With reference now to FIG. 5, an exemplary account screen 500 is shown displayed on the account representative workstation 300 during execution of the account representative app 342. As discussed previously, the instructions and data required for execution of the account representative app 342 may all reside on the account representative workstation 300, or may reside in large part on the collection server 200 and accessed by the account representative workstation 300 via a local area network.

The account screen 500 may be presented to the account representative in one of several ways. If the telephone dialing system 245 is using an autodialer, the account representative app 342 displays the account screen 500 when the autodialer detects that a live person has answered a call. In this case, the account representative will be presented with the account screen at the time a live call is detected, and the account representative will review the account screen as he or she speaks with the person at the other end of the call. If the telephone dialing system 245 is using an autodialer being used in a mode that requires human intervention, the account representative app 342 displays the account screen 500 upon an indication that the account representative is ready to view the next account in his or her account queue. In this case, the account representative has the opportunity to review the account screen 500 prior to making a call to the listed account holder, or during the time the system is calling the account holder. This mode provides the account representative with more time to plan what he or she wishes to say prior to speaking with the account holder. If the telephone dialing system 245 is using a manual contact platform, the account representative app 342 typically displays the account screen 500 to the account representative prior to the account representative placing a telephone call. The account representative generally previews the account screen 500 prior to placing a call, and then directs the telephone dialing system 245 to launch a telephone call. If the account representative is using a manual contact switch, then the account representative will either type the ten digit telephone number or select the single telephone number to call from a list.

As shown in FIG. 5, the account screen 500 provides the account representative with relevant information about each account maintained in the debtor database 262. The account screen 500 includes a responsible party block 510, an accounts-in-set block 520, a place of employment block 530, a phone numbers block 540, and a recent history block 540. The blocks presented to the user will change depending on the button selected from the menu 570 provided along the left side of the screen. The account representative is also presented with a toolbar 580, allowing the user to select any of various tools available on the account screen 500.

The responsible party block 510 provides identification and contact information about the account holder, such as name, address, social security number, date of birth, primary phone number, and alternate phone number. The responsible party block 510 also includes identification information about the debt owed by the account holder. For example, the responsible party block may list the account balance, the status and phase of the collections process on the account, the most recent contact made with the account holder, and a primary account representative.

The accounts-in-set block 520 list all accounts associated with the account holder (i.e., the "responsible party" in block 510). Each account is identified by an account number, type of account, creditor name (or school name), a service date on the account, the current account balance, and related information about each account (e.g., whether the account has been consolidated with other accounts, etc.). While only a single account is shown in FIG. 5 (i.e., account number 21), it will be recognized that any number of accounts associated with a single account holder may also be included in the accounts-in-set block 520

The place of employment block 530 lists employment information concerning the account holder, including the name and location of the place of employment, years employed, and a telephone number for the place of employment.

The phone numbers block 540 lists all phone numbers known to be associated with the account holder and information about each telephone number. This information may include the type of telephone number (e.g., home, work, etc.), how the number is used by the account holder (e.g., primary, secondary, etc.), whether the telephone number has been verified, whether the number is a mobile number, whether the number is a bad number or a wrong number, and a rank for the telephone number. While only a single telephone number is listed in block 540 of FIG. 5, it will be recognized that any number of telephone numbers for the account holder may be provided in block 540.

Recent history block 550 shows any activity that has occurred on the account within some predetermined period of time. For example, the recent history block may show information on a recent amount billed to the account holder, the next payment due, the last payment made, and any dates associated with these activities. The recent history block may also show how many payments have been made or missed for the account over time.

The user notes block 560 show recent notes associated with the account holder based on past activities. The user notes block 560 provides the account representative with additional information about the account holder that may not be provided in any of the other blocks. For example, from the user notes block 560, the account representative may realize that the account holder has never been contacted before, or has been contacted several times in the recent past and the result of each contact. The account representative may also see how management has treated the account (e.g., an account that has been moved to a new phase of the collections process).

Figure 6:
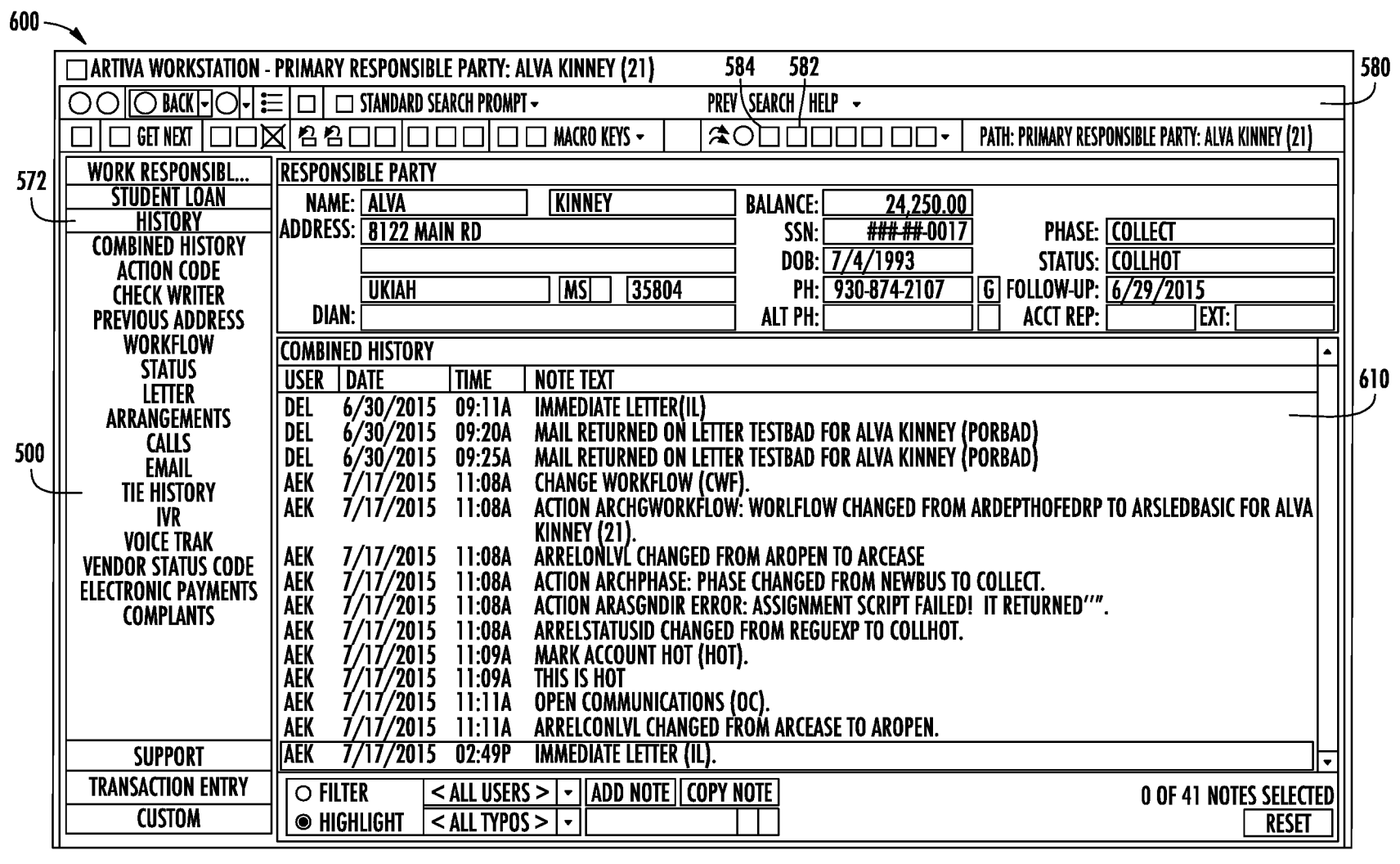

The menu 570 provides the account representative with access to any of various other screens that may be accessed by the account representative. Each of these screens provides additional information that may be of assistance to the account representative when speaking with the account holder or simply trying to contact the account holder. For example, if the history bar 572 is selected from the menu, the account representative is presented with the revised account screen 500 shown in FIG. 6. As shown in FIG. 6, when the history bar 572 is selected from the menu 570 along with the "combined history" menu option, a combined history block 610 is substituted on the screen in place of a number of previously displayed blocks (i.e., blocks 520, 530, 540, 550 and 560 are removed). The combined history block 610 shows the account representative a list of all activities that have occurred for the listed account holder. Each activity on the list includes a date, time and user performing the activity. It will be appreciated that the combined history list shows all attempted collection activities for an account, including activities that were unsuccessful (e.g., a call was prevented because it was outside of the state's safe call times, a letter was prevented because letters are not allowed into the state, etc.). The menu 570 provides other options with respect to this history, including a list of restricted activity that was attempted for the account, as explained in further detail below with respect to FIG. 19.

The toolbar 580 includes a list of icons. Each icon provides the user with access to a tool or a status identifier. For example, icon 582 presents the account representative with a telephone dialing tool, allowing the account representative to dial one of the telephone numbers associated with the debtor. Icon 584 is a status icon. If icon 584 is highlighted, the account representative is already connected to a call via the telephone line. Other icons provided along the toolbar 580 provide other tools that allow the account representative to work on the displayed account. As the account representative performs various activities related to the displayed account, data within the debtor database 262 will be accessed at the client workstation 310 and additional data will be added to the debtor database 262 via the client workstation 310.

Figure 7:
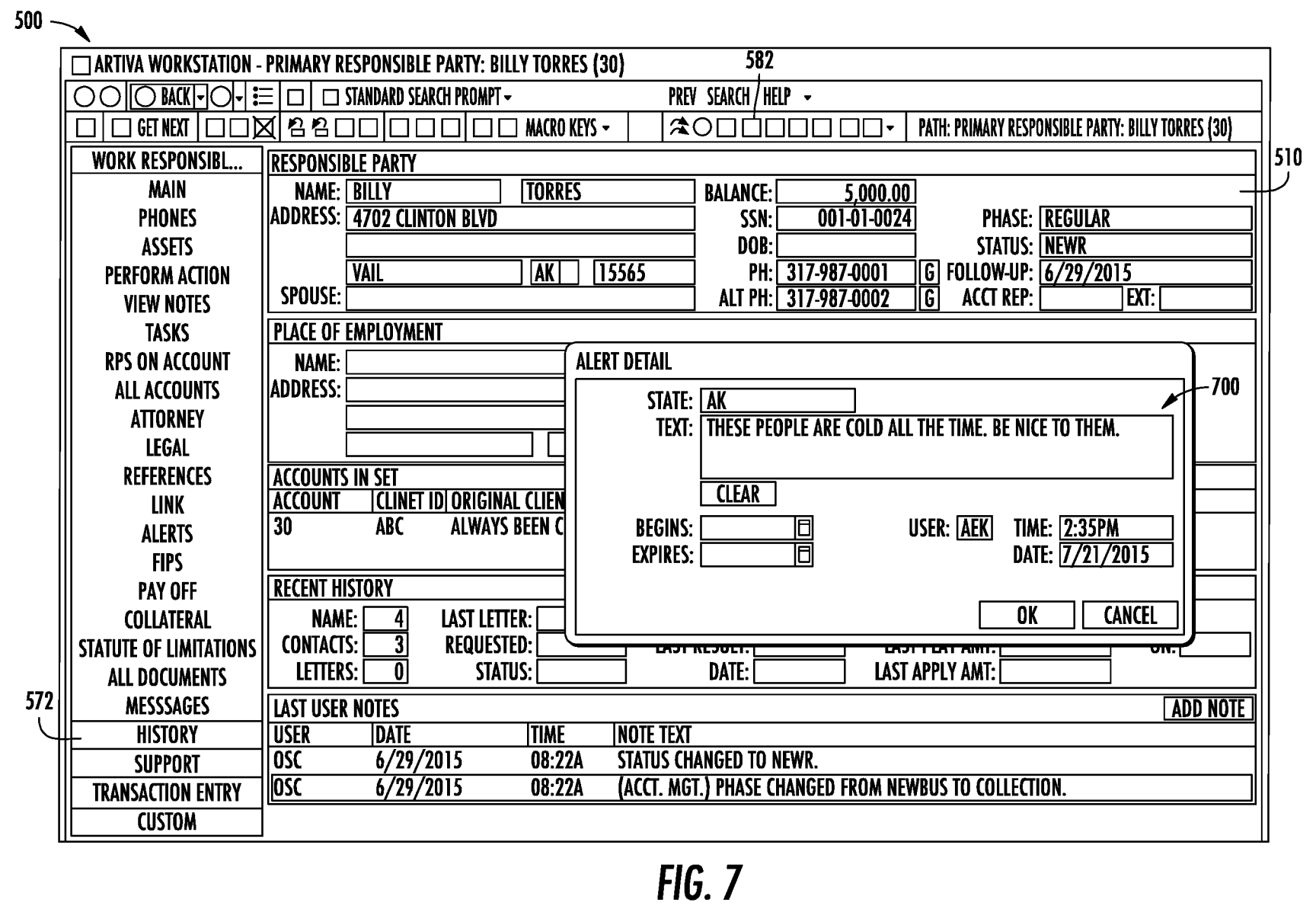

In addition to the information blocks, menu 570 and the toolbar 580, a user viewing the account screen 500 may also be provided with additional account information in pop-up blocks. These pop-up blocks are typically presented when a user attempts some action or makes some selection on the account screen 500. For example, a pop-up box may be presented to the account representative when he or she attempts an action that is not permitted. In these cases the pop-up box explains why the system 50 cannot take the requested action. As another example, pop-up boxes may be presented to the user in order to provide the user with information that may be relevant to a particular account. As shown in FIG. 7, when the user selects the call icon 582 in order to place a telephone call the debtor listed in the responsible party block 510, an alert pop-up block 700 is presented with additional information about the debtor. The information may be unique to the individual debtor or may be based on another factor, such as the location of the debtor. In the example of FIG. 7, the pop-up block includes information based on the location of the debtor. In this case, the user is asked to be nice to the debtor because it is cold in Alaska where the debtor lives. In other examples, the user may be reminded of other information that could be relevant to the collections process based on the debtor living in a certain geographic location. For example, if the account representative is calling a debtor in the state of Massachusetts, the account representative could receive a pop-up block reminding him or her that it is illegal to solicit a pre-dated check in the state of Massachusetts. In any event, the information in the pop-up block is relevant to the collections process in some way. This information may not only be related to restrictions, but may be related to news or other information such as news related to the debtor's employer and related collection or financial services industry law suites (e.g., class action suits). Additional types of information may also be presented in the pop-up block, such as news concerning recent natural disasters, economic news, sports stories, or any other of a number of topics that could possibly be relevant during the call with the debtor.

Figure 8:
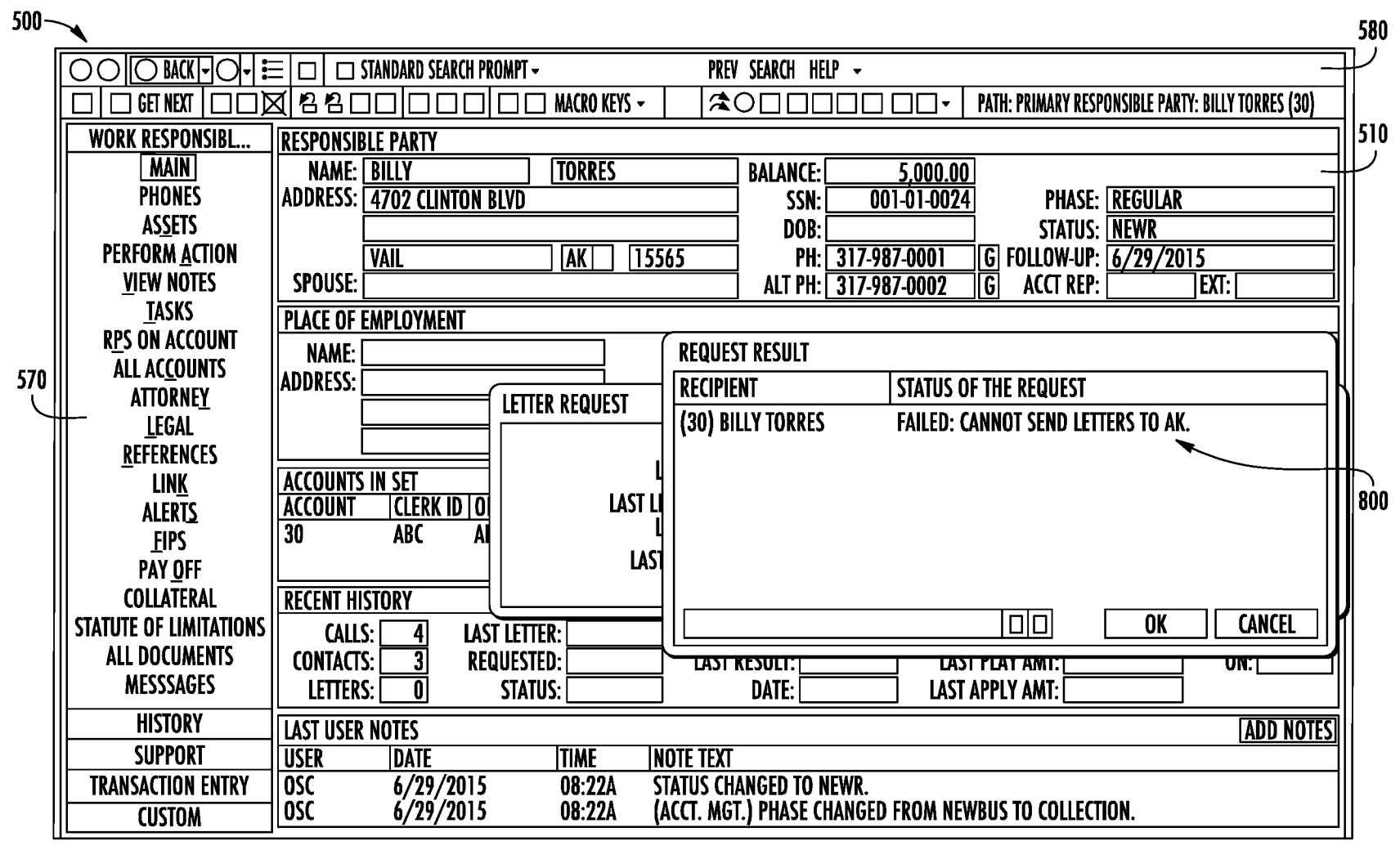

As mentioned in the preceding paragraph, the collection app 244 and the associated account rep app 342 are configured to restrict certain activities of the account representative when such activities are not permitted under any of a number of defined restrictions in the restrictions database 264. For example, as shown in FIG. 8, the account representative requested that a letter be sent to the debtor shown in the responsible party box 510 (i.e., by selecting the "perform action" option from the menu 570 and then indicating that a letter should be sent). The reason for sending a letter may be that the account representative has been unable to reach the debtor by telephone following a number of unsuccessful call attempts. However, unknown to the account representative, letters cannot be sent to debtors in the state of Alaska. In this situation, the collection app 244 checks the restrictions database 264 prior to authorizing the requested letter to Alaska. After checking the restrictions database 264, the collection app 244 recognizes that the collections agency for which the account representative works is not licensed in Alaska, and therefore a letter to a debtor in Alaska is not permitted in this case. Accordingly, the account representative is presented with the pop-up screen 800 of FIG. 8, alerting the account representative that the requested action of a letter to the debtor is not permitted. The account representative may then pursue other options for trying to contact the debtor, knowing that if any of the options selected by the account representative are not permitted, the collections app will alert the debtor of the restriction. While the example of FIG. 8 shows a restricted action with respect to a letter, it will be recognized that alerts may be sent to the account representative when he or she attempts any number of restricted collection activities (e.g., attempting to call the debtor outside of state mandated call windows).

Local and Remote Restrictions Databases

With reference again to FIGS. 1-3, the restriction features server 100 includes a first restrictions database 152 which is associated with the restrictions features server 100. The restrictions features server 100 is remote from the collection server 200 which includes a second restrictions database 264. However, the restriction features server 100 is in communication with the collection server 200 via the internet 42. Accordingly, updates to the second restrictions database 264 may be made based on the data in the first restrictions database 152. The first restrictions database 152 may be referred to herein as a "remote restrictions database", and the second restrictions database 264 may be referred to herein as a "local restrictions database".

The remote restrictions database 152 may include any number of different restrictions, but primarily includes federal, state, non-state and client restrictions. These restrictions entered into the remote restrictions database 152 are generally based on federal and state laws and regulations. Other restrictions may be non-state restrictions that occur in the event of widely known natural disasters or similar events (e.g., no collection activity due to a hurricane in a designated number of zip codes). A team of individuals associated with the restriction features server 100 performs research on the applicable federal and state laws, regulations and orders and regularly update these restrictions. An administrator of the restriction features server 100 enters the restrictions into the remote restrictions database 152.

The local restrictions database 264 is a secondary database that includes all of the restrictions in the first restrictions database 152 along with additional restrictions, and particularly restrictions related to the office-policies of the collections agency, restrictions related to clients that are not included in the first restrictions database 152, and non-state restrictions that have yet to be entered in the first restrictions database 152. Examples of office-policy restrictions include additional dates or times when calls cannot be sent (e.g., no calls on the boss's birthday since the office is closed), or restrictions related to particular activities (e.g., the office does not send emails or text messages to debtors for any reason). Examples of client restrictions may include specific client restrictions for local clients that are not managed or included within the first restrictions database (e.g., a local doctor's office may have a restriction limiting collection activities on patients who use Medicaid to once a week). Examples of non-state restrictions include a restriction entered into the local restrictions database 264 by the administrator of the collection server 200 who has knowledge of local flooding in various counties.

The local restrictions database 264 is regularly updated based on the contents of the remote restrictions database 152. When this occurs, all of the restrictions of the remote restrictions database 152 are imported into the local restrictions database 264. As a result, the local restrictions database includes all of the restrictions of the remote restrictions database 152, plus additional restrictions as previously entered by the administrator of the collection server 200. Updates to the local restrictions database 264 may be made regularly as determined by the administrator by importing the data from the remote restrictions database 152. For example, updates to the local restrictions database may occur before each call made by the telephone dialing system 245 or periodically as determined by the administrator (e.g., hourly, daily, weekly, etc). Accordingly, it will be recognized that the remote restrictions database 152 is capable of connecting with any number of collections servers 200 and updating each local restrictions database 264 in a regular manner. The collection servers 200 are capable of receiving restrictions from outside of their local systems (i.e., the collection servers 200 receive updated restrictions from the remote restrictions database 152). This advantageously relieves each administrator of a local restrictions database 264 of the need to constantly monitor all federal, state, non-state and client restrictions. Instead, each administrator of a local restrictions database 264 may simply remain focused on office-policy restrictions, local client restrictions, and local non-state restrictions.

Defining Restrictions in the Remote Restrictions Database

With reference now to FIG. 9, an exemplary safe calling hours screen 900 is shown. This screen 900 is presented on the restriction features workstation 102 coupled to the restriction features server 100. An administrator of the remote restrictions database 152 is presented with this screen in order to define safe calling hours in each of the fifty states in the United States and the ten provinces of Canada. Each state includes drop-down menus 902 that allow the administrator to define calling hour restrictions for each jurisdiction. In particular, the administrator uses the drop-down menus 902 to enter allowable start times and end times for autodialer calls on Monday-Saturday as well as on Sunday. The administrator also uses the drop-down menus 902 to enter allowable start times and end times for calls placed on a manual contact platform on Monday-Saturday as well as on Sunday. It will be recognized that the allowable start times and end times for calls will often differ in each jurisdiction, based on what type of telephone dialing system being used (i.e., autodialer vs manual contact platform), and on different days of the week (i.e., Monday-Saturday vs. Sunday). Because this information is conveniently retained in a master location in the remote restrictions database 152, the local collection agencies where each collection server 200 is located are not burdened with the need to define these restrictions for themselves. Instead, each collection server 200 is configured to regularly connect to the restriction features server 100 and update the local restrictions database 264 to match the information in the remote restrictions database 152.

Figure 10:
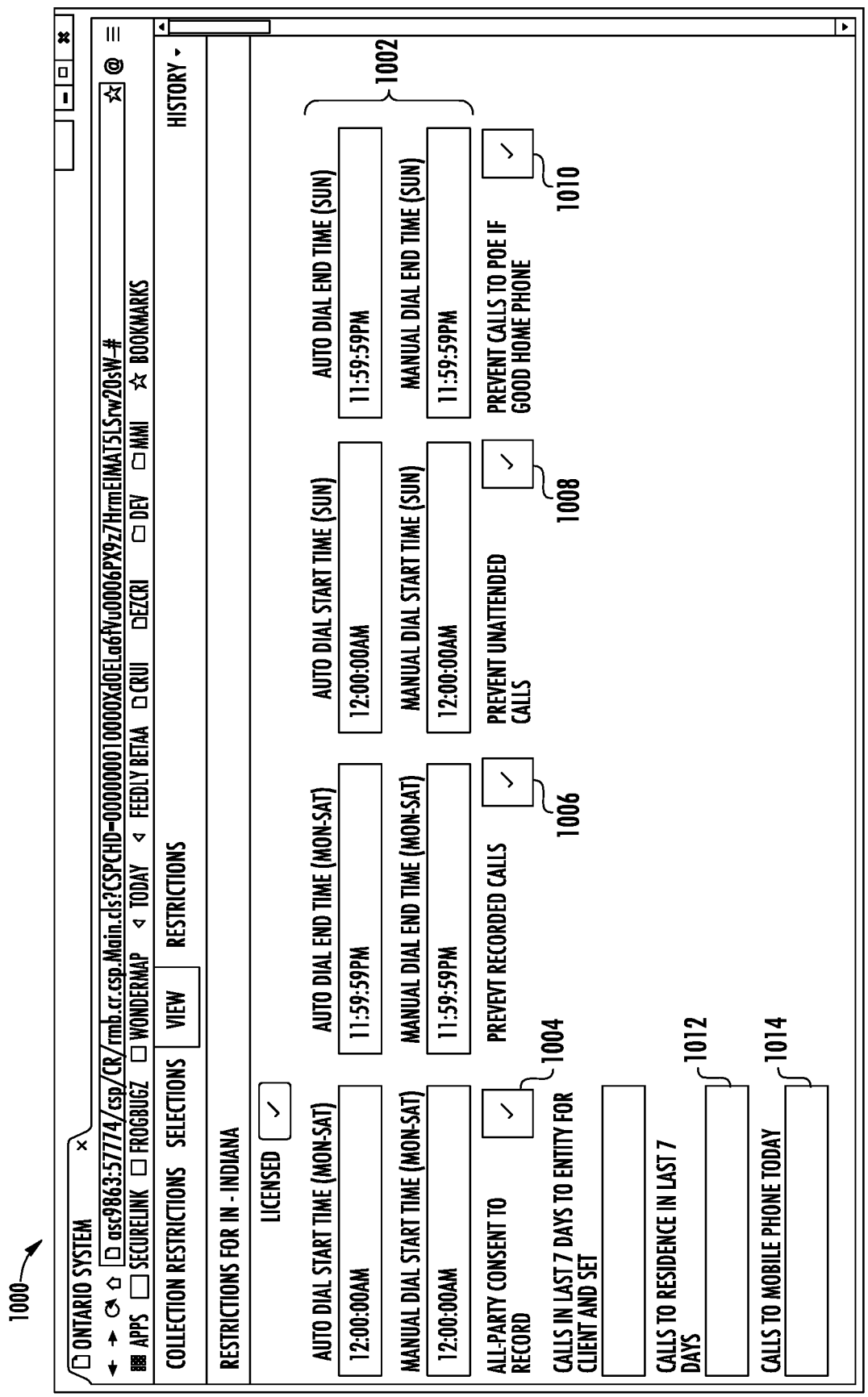
FIG. 10 shows an exemplary screen shot of an state restrictions screen for the restriction features server of FIG. 2.

With reference now to FIG. 10, additional restrictions for each state may also be defined by the administrator of the remote restrictions database 152. In this case, the administrator has pulled up the Indiana restrictions screen 1000, which lists of all state-specific restrictions for the state of Indiana (e.g., the administrator may reach this screen by clicking on "IN" in the state column of the safe calling hours screen of FIG. 9 or using other appropriate state selection menus). When the Indiana restrictions screen 1000 is presented, the previously defined safe calling hours are presented across the top portion of the screen (as noted by reference numeral 1002). The administrator may then indicate other restrictions that apply in Indiana by simply making the appropriate selections on the screen (e.g., checking boxes or entering the appropriate information in the space provided). For example, box 1004 may be used to indicate that all-party consent must be granted before a call can be recorded, box 1006 may be used to indicate that no recorded calls may be made, box 1008 may be used to indicate that no non-live (i.e., recorded) calls may be made, and box 1010 may be used to indicate that calls may not be made to the account holder's place of employment if a good home phone is available. Similarly, box 1012 may be used to indicate a maximum number of calls that may be made to a client within one week, and box 1014 may be used to indicate a maximum number of calls that may be made to a mobile telephone in one day. It will be recognized that the restrictions illustrated in FIG. 10 are representative of only a few of the possible restrictions that are possible, and that numerous other restriction options will be presented on the screen 1000. Moreover, the same restrictions options are generally listed for each restrictions screen for each state. Therefore, not all of the options will apply in every state, so many of the options boxes may be left blank in any given state.

Defining Restrictions in the Local Restrictions Database

With reference now to FIG. 11, an exemplary licensing restrictions screen 1100 is shown. This screen 1100 is presented on the administrator workstation 202 coupled to the collection server 200 shown in FIG. 1. An administrator of the local restrictions database 264 is presented with this screen in order to define those states in which the collections agency is licensed to operate. The administrator may simply go down the licensed column 1102 and select those states in which the collection agency is licensed to conduct collection activities (e.g., make calls, send letters, etc.). A start date for each license may be noted in column 1104, and an end date may be noted in column 1106. If an account representative attempts to perform a collection activity (e.g., place a call) in any state where the collection agency is not licensed, the activity will be blocked by the collection app 244 or the associated account representative app 342.

Figure 12:
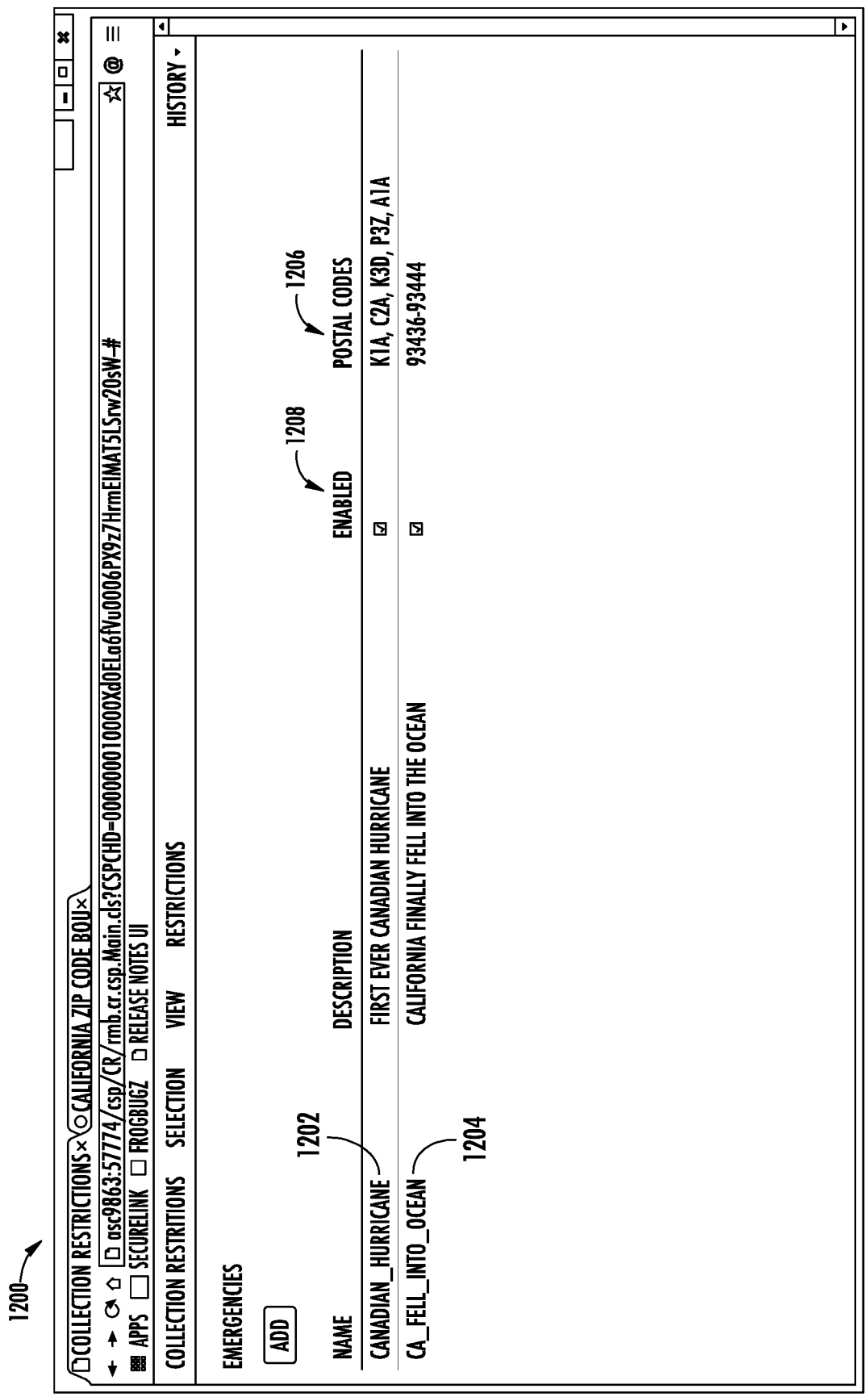
FIG. 12 shows an exemplary screen shot of a non-state restrictions screen for the collection server of FIG. 3.

With reference to FIG. 12, an exemplary non-state restrictions screen 1200 is shown. This screen 1200 is presented on the administrator workstation 202 coupled to the collection server 200. Alternatively, this screen may also be presented on the collection features workstation 102 coupled to the collection features server 100. In any event, using the non-state restrictions screen, an administrator is provided with the opportunity to define restrictions that are not state-wide and instead are limited to certain geographic regions which may or may not cross state boarders. These geographic regions may be, for example, based on postal codes (including ranges of postal codes), counties, or townships. In the example of FIG. 12, two non-state restrictions have been defined in rows 1202 and 1204. Each non-state restriction is based on postal codes, as noted in column 1206. During the time in which the defined restrictions are enabled in column 1208, no collection activity may occur in the defined geographic regions during that time (e.g., a day, week, month, etc.). However, once the defined restrictions are removed by disabling the restriction in column 1208, collection activity may occur again in these regions.

Non-state restrictions such as those illustrated in non-state restrictions screen 1200 may be particularly relevant during times of natural disasters, emergencies or related occurrences. In many situations, these non-state restrictions are optional restrictions that vary from client-to-client. For example, the federal government may chose to suspend collection activities related to educational loans in the event of a natural disaster, but a bank may choose to continue with all collection activities. Therefore, the non-state restrictions screen 1200 may also include options that allow each defined restriction to apply to certain clients (and their related accounts), but not apply to other clients.

While the local restrictions database 264 has been described herein as including information that is distinct from that found in the remote restrictions database 152, in at least one embodiment all of the data in the local restrictions database 264 is also stored in the remote restrictions database 152. In this embodiment, more local restrictions (e.g., office restrictions, etc.) are stored together with more global restrictions (e.g., federal and state restrictions) and the restrictions are applied based on the attributes of the account (e.g. a restriction scope that covers an "office" which is a local instance of a more wide-spread enterprise which may have authority to create their own restrictions).

Restrictions Defined Based on Restriction-Type

Figure 13:
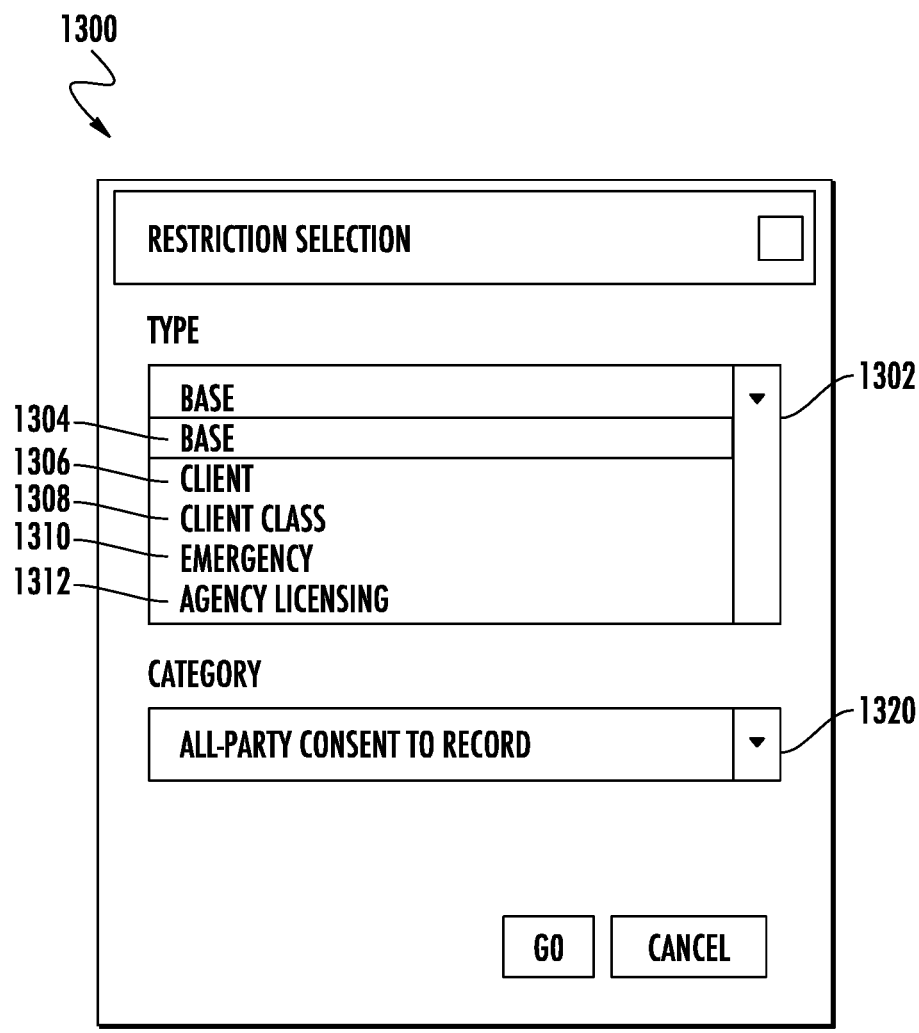
FIG. 13 shows an exemplary portion of a screen shot with a restriction selection box for the restriction features server of FIG. 2.

With reference now to FIGS. 13 and 14, in at least one embodiment, when a restriction is defined in either the remote restrictions database 152 or in the local restrictions database 264, the user is first asked to define a level at which the new restriction will apply. For example, as shown in FIG. 13, when the administrator indicates that he or she would like to define a new restriction, the administrator is presented with the restriction selection box 1300. This restriction selection box 1300 includes a restriction-type box 1302 and a restriction category box 1320. The restriction-type box allows the administrator to choose one of a number of different restriction types in a restriction to which the new restriction will apply. In particular, the administrator may choose base 1304 (i.e., federal), agency licensing (i.e., state) 1312, client 1306, client class 1308, and emergency 1310. As discussed previously, federal-type restrictions apply to all states, state-type restrictions are limited to individual states, and client-type restrictions are limited to individual client creditors. Client class-type restrictions are limited to all clients in a particular field or line of commerce (e.g., banks, school loans, government debt, credit cards, etc.).

With reference now to FIG. 14, after restriction-type is chosen in box 1302, the administrator is presented with a drop-down menu 1322 in category box 1320 of all possible categories of restrictions within the selected type. In the example of FIG. 14, the administrator is defining a federal restriction in box 1302, and the drop-down menu 1322 shows all available categories of federal restrictions. After selecting the appropriate category of federal restriction from the menu 1322, the user is presented with an additional screen or box allowing the administrator to further define the restriction (e.g., define call start times, end times, etc.). Accordingly, the arrangement of FIGS. 13 and 14 provide the administrator with a structure to quickly and easily define restrictions within the appropriate restrictions database.

It will be recognized that in certain situations, restrictions may conflict. In these situations, the most restrictive restriction is the restriction that is implemented in the interest of conservatively maintaining all restrictions. As a result, less restrictive restrictions are complied with when more restrictive restrictions are observed. For example, consider a less restrictive restriction that allows a debtor to be called as many as ten times, and a more restrictive restriction that only allows the debtor to be called eight times. In following the more restrictive restriction and restricting the ninth call, the less restrictive restriction is also observed.

Audits

With reference now to FIG. 15, any amendments that are made to the restrictions are recorded in the records portion of the memory (i.e., amendments to remote restrictions database 152 are retained in the records 154 in memory 124 of the restriction features server 100, and amendments to the local restrictions database 264 are retained in the records 254 in memory 224 of the collection server 200). FIG. 15 shows an exemplary audit screen 1500 wherein a particular user (i.e., meganj) has updated the value of the permissible calling times in Hawaii several times. For each action in the restrictions database, the audit screen 1500 lists an action 1502, a date 1504, a time 1506, a user 1508, a field 1510, a new value 1512, and an old value 1514. In the example of FIG. 15, it can be seen that on Jul. 22, 2015 meganj amended the permissible auto_start calling time from 8:00:00 am to zero, and then from zero to 11:59:59 pm. With this information retained by the system 50, audits may be easily performed to determine whether any errors with respect to restrictions on collections activity occurred and why such errors occurred.

FIG. 16 shows an exemplary audit report request screen 1600 that an administrator may use to generate reports for the system for an auditor. As shown in FIG. 16, the audit report request screen 1600 allows the administrator to generate reports for activity that occurred system-wide across all accounts (e.g., all accounts managed by the collection agency associated with collection server 200). In this case, the administrator may prepare a report to show an auditor that they are restricting a particular collection activity in a particular jurisdiction. The administrator uses the drop down menus 1602 to select a given date range, and drop down menus 1604, 1606, 1608, 1610 and 1612 to select one or more of a client class, client, state, specific collection activity, or collection result. For example, an administrator may use the drop down menus to select all restricted telephone calls on a given day for a given client in a given state (not limited to a single account). This information may then be provided to an auditor to prove that the collection agency is properly observing restrictions for the client (or other party, such as a state auditor).

Restriction Overrides and Related History

Figure 17:
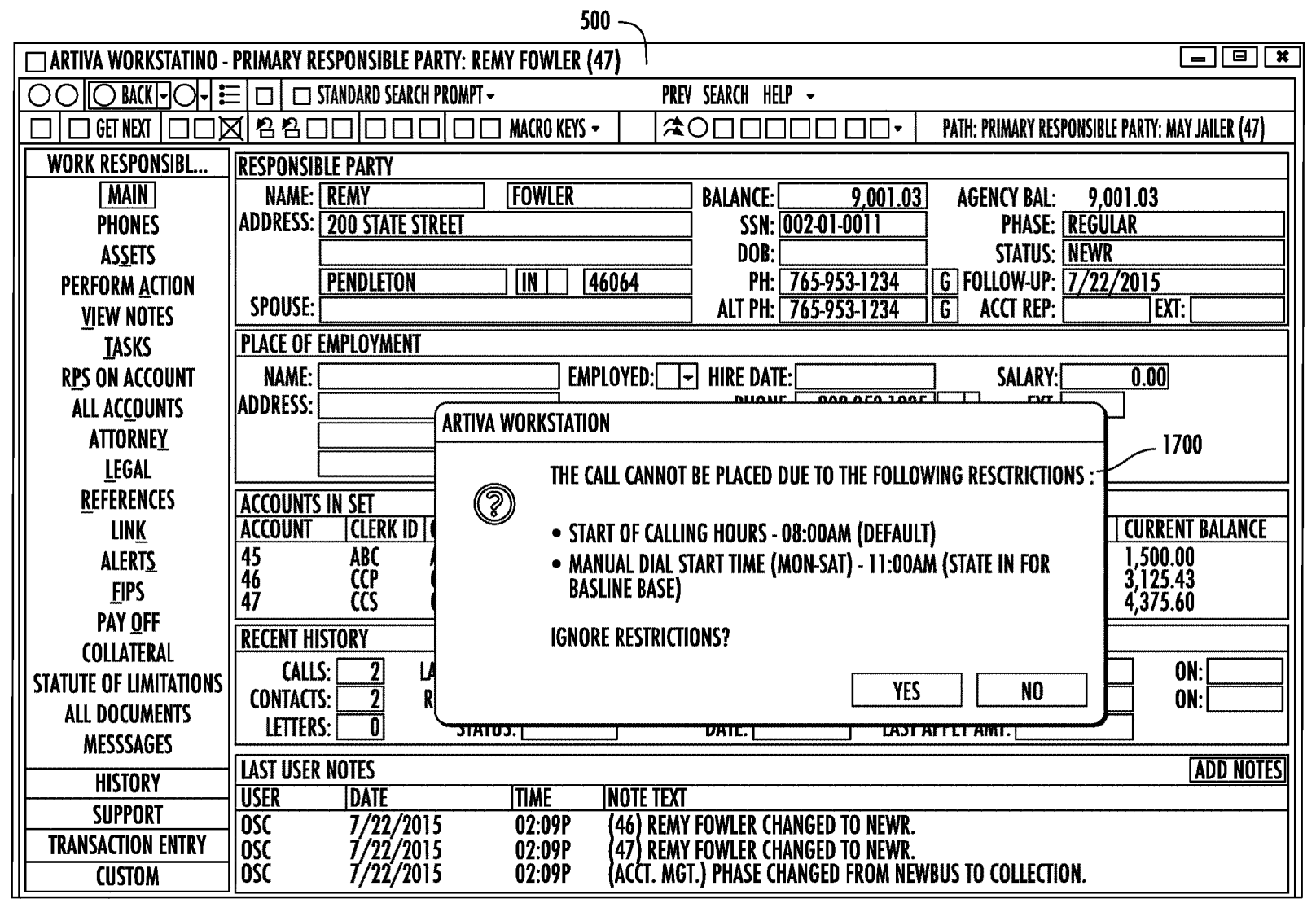
Figure 18:
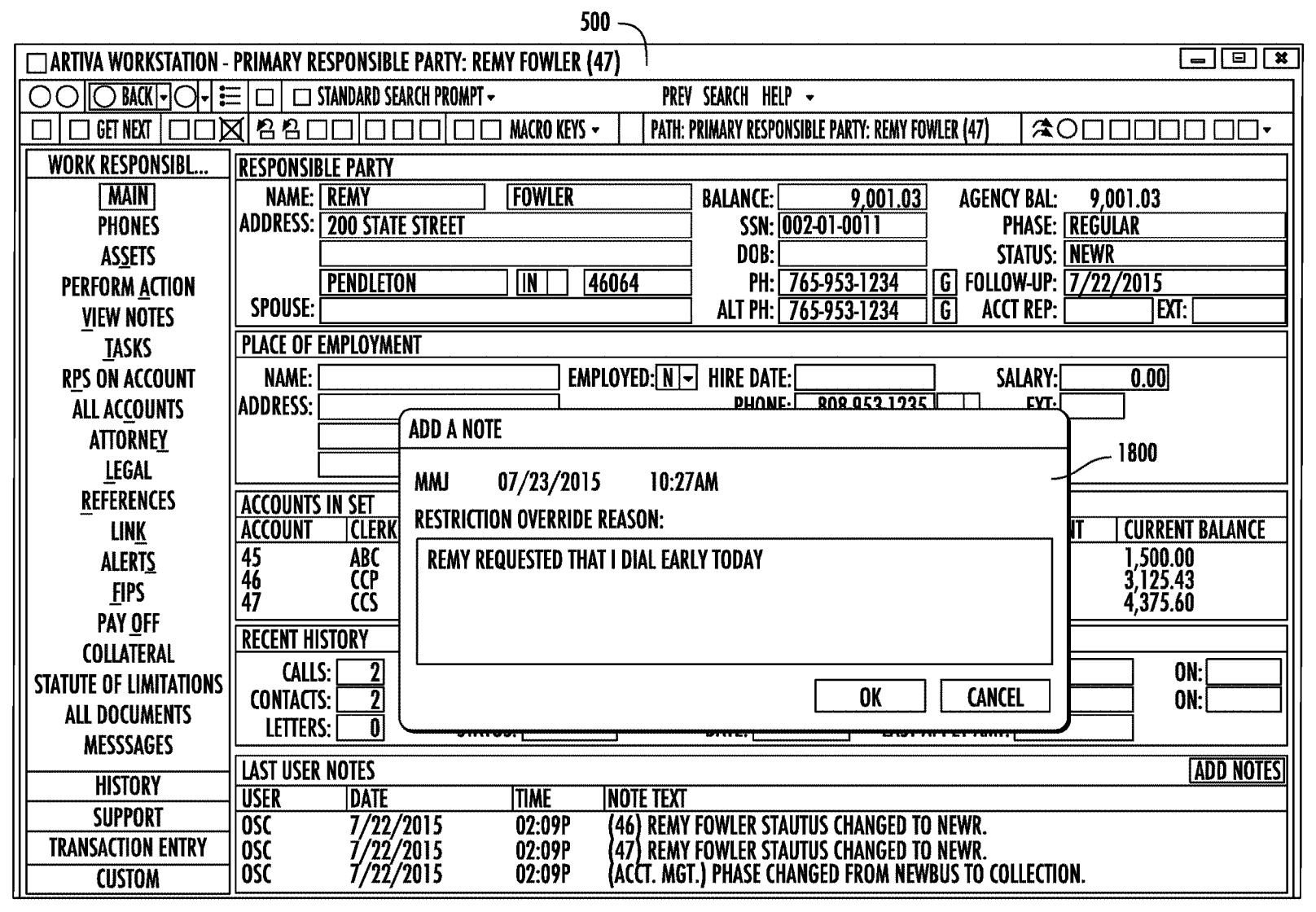

With reference now to FIGS. 17-19, in certain situations an account representative may have the ability to override a presented restriction. In the example of FIGS. 17-19, the account representative has attempted to place a call using a telephone dialing system utilizing the manual contact platform, and the call is outside of safe calling hours to a resident of Indiana. Accordingly, as shown in FIG. 17, the account representative is presented with a restriction warning pop-up box 1700. This pop-up box 1700 is similar to the pop-up box 700 shown in FIG. 7 and alerts the account representative of information related to the call being placed. In the example of FIG. 17, the pop-up box 1700 warns the account representative that the call cannot be placed because there is a restriction on the call because the call is being attempted outside of safe calling hours. This is one example of access to the telephony network by the telephone dialing system 245 being restricted based on the information in the local restrictions database 264.

In some situations, the account representative will have the option of ignoring or otherwise overriding the restriction. For example, if the account representative chooses to ignore the restriction by pressing the "yes" button in the pop-up box 1700 of FIG. 17, the user is presented with a note box 1800, as shown in FIG. 18. In this case, the user enters a reason for overriding the restriction, and the call may proceed. In this embodiment, the user may override the restriction for any reason deemed appropriate by the user. However, in at least one embodiment, the system analyzes the reason entered for the restriction, and will only allow the user to proceed if an appropriate reason is given (e.g., the user must enter a particular phrase such as the debtor "requested an earlier call"). Typically, the only reason a call restriction based on calling hours may be overridden is that the account holder has requested to be called outside of safe calling hours. In the example of FIG. 18, this is the reason for overriding the restriction that has been entered in the note box 1800. Based on this note, the system 50 will permit the account representative to proceed with the call. However, any other reason entered into the note field would be invalid, and the restriction would remain in place blocking the call to the account holder.

FIG. 19 shows another exemplary view of the account screen 500 wherein the restrictions button 576 has been selected from the menu 572. In this screen, the account representative is presented with a collection restrictions history box 1900 that shows all restricted activity related to the account holder in the responsible party box 510. Two different restricted activities are shown in the collection restrictions history box 1900 in the example of FIG. 19. In particular, row 1902 notes the restricted activity described above with respect to FIGS. 18-19. In this row 1902, data is provided to show that a call by user MMJ on Jul. 23, 2015 was restricted, but that the restriction was overridden by MMJ for the reason provided in the "override reason" column. Similarly, data is provided in row 1904 of box 1900 to show that the system 50 also restricted additional collection activity that was not associated with any account rep. In particular, this row 1904 shows that the system (i.e., "sys" in row 1904) attempted to dial the account holder on Jul. 22, 2015 at 2:09 using the autodialer. This restriction was not overridden and simply resulted in no call being made to the account holder. Accordingly, it will be recognized that the account representative app 342 and the associated collection app 244 are configured to write records concerning collection activities that were blocked by the system based on defined restriction activities, and store those records in the appropriate memory location (e.g., records 254 of the collection server or records 354 of the account representative workstation 300). These records apply to not only a manual dial mode where an account representative is made aware of the restricted activities, but also in the autodialer mode where no human is aware that the restriction has blocked any particular collection activity. This allows the account representative or other user to be presented with a history of all restrictions that occurred for a given account. Moreover, as discussed previously, if an audit is being conducted, this feature allows the administrator to prepare reports that show all restricted activity by the system, including restricted activity for telephone dialing systems using the manual dialing platform as well as an autodialer.

Figure 20:
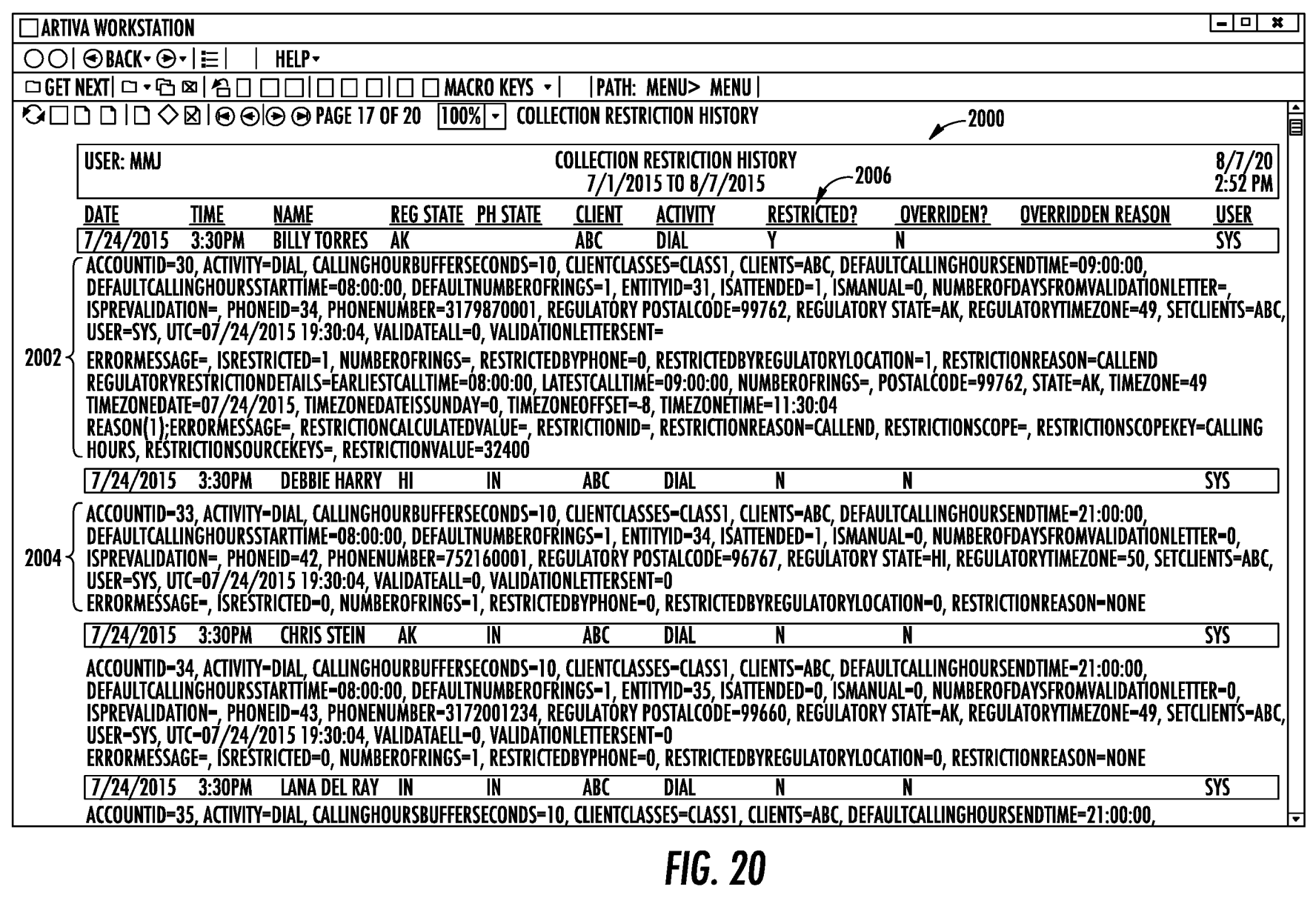

In addition to the foregoing, it will be recognized that the collection management system 50 is configured to record and report on all restriction activity, regardless of whether or not the restriction activity resulted in a restricted call or other restricted collection activity. In other words, the collection management system 50 is configured to record and report all restriction inquiries against the restrictions database 264. FIG. 20 shows a screen shot of an exemplary report 2000 of restriction activity. Block/record 2002 of the report 2000 shows that a call was restricted to the state of Arkansas at 3:30 pm on Jul. 24, 2015, based on an inquiry to the restrictions database 264 by the system. This can be seen clearly from the "Y" (for yes) in the restricted column 2006 of the report 2000 for block 2002. Block/record 2004 of the report shows that another inquiry against the collections database 264 was made by the system at 3:30 pm on Jul. 24, 2015, but that inquiry did not result in any restricted collection activity and a resulting call was placed to the state of Hawaii. This is shown by the "N" (for no) in the restricted column 2006 for block 2004. Accordingly, it will be recognized that the collection management system 50 is configured to record restriction activity and provide reports concerning the history of restricted and non-restricted activities based on inquires against the restrictions database 264. The collection management system 50 is thus configured to decide whether a particular collection activity is allowed or disallowed, regardless of whether the attempted collection activity is associated with a person (e.g., a manual collection activity attempted by an account representative) or a machine (e.g., and automatic collection activity attempted by the collection management system). As shown in FIG. 20, customized reports on restriction activity may be generated. These reports may show any of various restriction related activity as defined by the user. For example, these reports may show only restricted activity following an inquiry against the collections database 264, only non-restricted activity following an inquiry against the collections database 264, or both.

The foregoing detailed description of one or more exemplary embodiments of the system and method for managing restrictions on collections activity has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. A collection management system comprising:
a restriction features server including a first memory, the first memory comprising a remote restrictions database defining first collection activity restrictions for a plurality of jurisdictions;
one or more collection servers configured to connect to the restriction features server, the one or more collection servers including a second memory comprising records, a debtor database, and a local restrictions database, the debtor database defining a plurality of debtors and debts owed by the plurality of debtors, the local restrictions database defining second collection activity restrictions in addition to the first collection activity restrictions, wherein the second memory is updated to include the first collection activity restrictions when the one or more collection servers are connected to the restriction features server;
a telephone dialing system connected to the one or more collection servers, the telephone dialing system configured to access a telephony network and dial one or more telephone numbers, each of the telephone numbers associated with a debtor telephone, wherein access to the telephony network by the telephone dialing system is restricted in real time based on the first collection activity restrictions and the second collection activity restrictions defined in the local restrictions database, and wherein the records of the one or more collection servers include instances of restricted access to the telephony network by the telephone dialing system; and
a plurality of account representative workstations connected to the one or more collection servers, each of the plurality of account representative workstations including a graphical user interface configured to (i) display an account screen for one of the plurality of debtors, the account screen comprising data from the debtor database (ii) display a restriction warning on the account screen when access to the telephony network by the telephone dialing system is restricted based on the first collection activity restrictions and the second collection activity restrictions defined in the local restrictions database for the debtor jurisdiction, (iii) display an override option including a window configured to receive a reason for restriction override, (iv) receive the reason for restriction override in the window, and (v) determine whether the entered reason for restriction override is valid by analyzing the reason for restriction override to determine whether the reason includes a predetermined phrase;
wherein the telephone dialing system accesses the telephony network and dials the at least one debtor telephone number when the received reason for restriction override is determined to be valid.

2. The collection management system of claim 1 wherein the plurality of jurisdictions include a plurality of state and federal jurisdictions, wherein the first collection activity restrictions include federal restrictions and state restrictions, and wherein the restriction features server is housed at a remote location from the one or more collection servers.

3. The collection management system of claim 2 wherein the state restrictions define safe calling hours for a plurality of states.

4. The collection management system of claim 1 wherein the telephone dialing system is provided in the memory of the one or more collection servers, and wherein the one or more collection servers and the telephony network are connected via a wide area network.

5. The collection management system of claim 1 further comprising a headset connected to each of the plurality of account representative workstations.

6. The collection management system of claim 1 wherein the telephone dialing system is configured to operate as an autodialer.

7. The collection management system of claim 6 wherein the records of the one or more collection servers include instances of restricted access to the telephony network by the telephone dialing system when the telephone dialing system operates as an autodialer.

8. The collection management system of claim 1 wherein the telephone dialing system is configured to dial the plurality of telephone numbers by generating voice over internet protocol calls.

9. A method of restricting access to a telephony network in a collection management system, the method comprising:
defining first collection activity restrictions in a remote restrictions database, the first collection activity restrictions related to government-mandated collection activity restrictions for a plurality of jurisdictions;
defining second collection activity restrictions in a local restrictions database, the second collection activity restrictions not based on the government-mandated collection activity restrictions for the plurality of jurisdictions;
updating the local restrictions database to include the first collection activity restrictions;
prohibiting a telephone dialing system from making a telephone call to a debtor telephone in real time based on the first collection activity restrictions and the second collection activity restrictions, the telephone dialing system configured to access the telephony network and dial a plurality of telephone numbers, each of the plurality of telephone numbers associated with one of a plurality of debtor telephones;
displaying a restriction notice at a graphical user interface of one of a plurality of account representative workstations connected to the telephone dialing system when the telephone dialing system is prohibited from making the telephone call to the debtor telephone;
receiving entry of a restriction override request via the one of the plurality of account representative workstations;
determining whether the restriction override request is valid by analyzing an entered reason for restriction override in order to determine whether the reason includes a predetermined phrase;
overriding the prohibition of the telephone dialing system from making the telephone call to the debtor telephone when the reason for restriction override is determined to be valid; and
reporting the prohibition of the telephone dialing system from making the telephone call to the debtor telephone.

10. The method of claim 9 wherein the first collection activity restrictions include federal restrictions and state restrictions, and wherein the remote restrictions database is housed at a remote location from the local restrictions database.

11. The method of claim 10 wherein the state restrictions define safe calling hours for a plurality of states.

12. The method of claim 9 further comprising displaying a notice at one of a plurality of account representative workstations when the telephone dialing system is prohibited from making the telephone call to the debtor telephone.

13. The method of claim 12 further comprising overriding the prohibition of the telephone dialing system from making the telephone call to the debtor telephone if an override request is received at the one of the plurality of the account representative workstations.

\* \* \* \* \*